US012535575B2

(12) United States Patent
Critchley et al.

(10) Patent No.: US 12,535,575 B2
(45) Date of Patent: Jan. 27, 2026

(54) OBJECT TRACKING USING RADAR FOR AUTONOMOUS SYSTEMS AND APPLICATIONS

(71) Applicant: NVIDIA Corporation, Santa Clara, CA (US)

(72) Inventors: James Critchley, Lake Orion, MI (US); Kyle Kolasinski, Howell, MI (US); Brian Dobkowski, Merrick, NY (US)

(73) Assignee: NVIDIA CORPORATION, Santa Clara, CA (US)

( * ) Notice: Subject to any disclaimer, the term of this patent is extended or adjusted under 35 U.S.C. 154(b) by 461 days.

(21) Appl. No.: 18/331,391

(22) Filed: Jun. 8, 2023

(65) Prior Publication Data
US 2024/0411007 A1 Dec. 12, 2024

(51) Int. Cl.
*G01S 13/72* (2006.01)
*G01S 7/41* (2006.01)
*G01S 13/58* (2006.01)
*G01S 13/931* (2020.01)

(52) U.S. Cl.
CPC ............ *G01S 13/723* (2013.01); *G01S 7/412* (2013.01); *G01S 13/589* (2013.01); *G01S 13/931* (2013.01)

(58) Field of Classification Search
CPC ........ G01S 13/589; G01S 13/723; G01S 7/41; G01S 7/415; G01S 13/931; G01S 7/412
See application file for complete search history.

(56) References Cited

U.S. PATENT DOCUMENTS

| 10,444,342 | B2* | 10/2019 | Zeng | G06V 20/58 |
| 10,739,769 | B2* | 8/2020 | Dean | G05D 1/81 |
| 11,774,575 | B2* | 10/2023 | Gosala | G01S 13/931 |
| | | | | 342/105 |
| 12,322,187 | B1* | 6/2025 | Boydston | G01S 13/931 |
| 2012/0027258 | A1* | 2/2012 | Uchida | G06T 7/20 |
| | | | | 382/103 |
| 2019/0107615 | A1* | 4/2019 | Eljarat | G01S 13/505 |
| 2019/0258878 | A1* | 8/2019 | Koivisto | G05D 1/00 |
| 2019/0354782 | A1* | 11/2019 | Kee | G06N 3/0464 |
| 2019/0361106 | A1* | 11/2019 | Stachnik | G01S 13/588 |
| 2020/0210726 | A1* | 7/2020 | Yang | G06V 10/25 |
| 2020/0326417 | A1* | 10/2020 | Shapiro | G01S 13/931 |
| 2021/0080558 | A1* | 3/2021 | Gosala | G01S 13/931 |

(Continued)

*Primary Examiner* — Peter M Bythrow
(74) *Attorney, Agent, or Firm* — Maschoff Brennan

(57) ABSTRACT

One or more embodiments of the present disclosure relate to identifying reference portions corresponding to a bounding shape that corresponds to an object. Additionally, the reference portions may include a first reference edge, a second reference edge, and a reference where the first reference edge and the second reference edge intersect. In some embodiments, operations may further include obtaining a first state estimate corresponding to the object and receiving first sensor data corresponding to a first portion of the object, the first sensor data including a first position measurement. Further, operations may further include determining that the first position measurement corresponds to a first reference portion that is one of the reference portions corresponding to the bounding shape and determining a first expected position corresponding to the first portion based at least on the first reference portion. Embodiments may additionally include determining a second position estimate corresponding to the object.

20 Claims, 12 Drawing Sheets

(56) References Cited

U.S. PATENT DOCUMENTS

| | | | |
|---|---|---|---|
| 2022/0176988 A1* | 6/2022 | Wang | G06V 20/56 |
| 2023/0003872 A1* | 1/2023 | Qian | G01S 13/723 |
| 2024/0077617 A1* | 3/2024 | Lawson | G01S 13/584 |

\* cited by examiner

OBJECT TRACKING USING RADAR FOR AUTONOMOUS SYSTEMS AND APPLICATIONS

BACKGROUND

Sensors—such as, by way of example and not limitation, RADAR (RAdio Detection And Ranging) sensors—are often used to track objects. The tracking of the objects may include tracking a position and/or velocity of the objects. In many instances, the tracking of the objects may be performed using a Kalman filter which may be configured to determine and update state estimates of the object based on previous state estimates and sensor data, such as RADAR data, that corresponds to the object.

In the context of object tracking, the state estimates may provide estimates for one or more movement characteristics of the object. For example, the state estimate corresponding to the object may include a position estimate corresponding to the object (or to the detected portion of the object). Additionally or alternatively, the state estimate may include a velocity vector estimate corresponding to a speed and direction corresponding to the object (or to the detected portion of the object).

Kalman filters may use a state estimate to make a determination of an expected measurement or anticipated measurement as to what one or more values of the sensor measurements may be. For example, based on a position estimate and a velocity vector estimate of a state estimate of an object, a determination may be made as to what may be an expected sensor measurement for the object. Additionally or alternatively, Kalman filtering techniques may use the expected measurement with an actual sensor measurement to determine an updated state estimate.

For example, in some embodiments, a Kalman gain may be determined based on the expected measurement and a covariance associated with the sensor measurements. The Kalman gain may indicate the extent to which the respective values of the sensor measurements may be factored into updating the state. Additionally, in some embodiments, a comparison may be made between the expected measurement and the actual sensor measurement. In some embodiments, the comparison may be used to determine differences (also referred to as "residuals") between the expected measurement. In some embodiments, the differences may indicate an accuracy of the state estimates. Additionally or alternatively, the Kalman gain may be applied to the residuals as part of determining the updated state. In some embodiments, Kalman filters may continue this process in an iterative manner.

In some instances, because portions of an object may be in different relative positions in relation to the sensor, multiple sensor measurements may be present for a single object where the multiple sensor measurements may correspond to one or more portions of the same object. Due to the relative locations of different portions of the object relative to the sensor, range rates and other measurements corresponding to the object may vary.

To account for the differences in sensor measurements corresponding to different portions of the same object, some traditional approaches may include sequentially running Kalman filter iterations (also referred to as "Kalman updates") with respect to multiple measurements (e.g., all of the measurements) that may correspond to different portions of the object. Another approach may include combining multiple measurements into a matrix and performing a Kalman update with respect to the matrix to determine a similar result as performing sequential Kalman updates. Both of these approaches may result in the state estimate corresponding to a particular tracking point corresponding to the object (e.g., which may correspond to a center of mass or a geometric center of the object in some instances).

However, due to relatively large differences between range rate measurements for various portions as compared to what may be occurring at the center of mass, performing Kalman updates in this manner may result in the velocity vector estimates of the state estimates having large levels of uncertainty. In some prior approaches, the velocity vector estimates may be ignored or discarded due to the large levels of uncertainty.

Additionally, when using multiple measurements to track a position of the object, some of the measurements may be more accurate and/or meaningful than others. For instance, some of the measurements may correspond to relatively clean reflections off the surface of the object that directly bounce back to the sensor. However, other measurements may be much noisier. For instance, some measurements may correspond to detections of reflections that bounced off the ground before and/or after striking some portion of the object. These measurements may not be nearly as accurate or indicative of the actual object as the relatively cleaner ones. Further, including such noisy measurements in Kalman updates may result in less accuracy and/or less certainty in the object tracking.

SUMMARY

According to one or more embodiments of the present disclosure, a first state estimate corresponding to an object may be obtained where the first state estimate may include a first velocity vector estimate corresponding to the object. Additionally, one or more embodiments may include receiving first sensor data that may correspond to a first portion of the object where, in some embodiments, the first sensor data may include a first angle measurement corresponding to a first angle with respect to a sensor and the first portion, and a first range rate measurement that may correspond to a first range rate corresponding to the first portion. In some embodiments, a first expected measurement corresponding to the first portion may be determined where the first expected measurement may correspond to the first portion of the object. In some embodiments a second state estimate corresponding to the object may be determined. In some embodiments, the determination of the second state estimate may include a second velocity vector estimate that may correspond to the object.

In these and other embodiments, the second velocity vector estimate may be based on the first range rate measurement and the first expected range rate. In some embodiments, sensor data corresponding to a second portion of the object may be received. In some embodiments, a second expected measurement corresponding to a second portion of the object may be determined based at least on an angle measurement and the second velocity estimate. In some embodiments, a third state estimate corresponding to the object may be determined. In these and other embodiments, the third state estimate may include a third velocity vector corresponding to the object where the third velocity vector may have been determined based on the second range rate measurement and the second expected range rate.

Therefore, rather than employing a traditional Kalman filtering technique in which expected sensor measurement determinations are performed only based on previous state estimates, the present disclosure also incorporates using some information from the sensor measurements as part of some expected measurement determinations (e.g., expected range rates). Such a technique may improve the tracking of objects that have multiple portions having respective measurements corresponding thereto by better accounting and compensating for differences between range rates at various portions. Further, the adjustment of the expected range rate determinations in this manner may be much simpler than clustering techniques, which may help reduce computational costs and/or reduce errors that may be hard to identify due to complexities in the clustering techniques.

In addition to improvements made to range rate (or velocity) determinations, improvements to position measurement in object tracking are included in the present disclosure. According to one or more embodiments of the present disclosure, one or more reference portions may be identified where the one or more reference portions may correspond to a bounding shape that may correspond to an object. In some embodiments, the bounding shape may be based at least on one or more sensor measurements that may correspond to the object. In some embodiments, the one or more reference portions may include a first reference edge, a second reference edge, and/or a reference vertex at which the first reference edge and the second reference edge may intersect.

One or more embodiments may additionally include obtaining a first state estimate, where the first state estimate may correspond to the object. In some embodiments, the first state estimate may include a first position estimate and a first velocity vector estimate. In some embodiments, first sensor data may be received that may correspond to a first portion of the object where the first sensor data may include a first position measurement. In some embodiments, the first position measurement may be determined where the first position measurement may correspond to a first reference portion that may be one of the reference positions that may correspond to the bounding shape. In some embodiments, a first expected position may be determined where the first expected position may correspond to the first portion based at least on the first portion. In some embodiments, a second position estimate may be determined where the second position estimate may be based at least on the first expected position and the first state estimate.

The embodiments of the present disclosure may help improve the tracking of objects that have multiple portions having respective measurements corresponding thereto by using position measurements that are more likely to be more accurate and less noisy. Further, the adjustment of the expected positions and residuals in this manner may be much simpler than clustering techniques, which may help reduce computational costs and/or reduce errors that may be hard to identify due to complexities in the clustering techniques.

BRIEF DESCRIPTION OF THE DRAWINGS

The present systems and methods for residual formulation for extended object tracking and expected range rate model generation are described in detail in the present disclosure with reference to the attached drawing figures, wherein.

DETAILED DESCRIPTION

Figure 1:
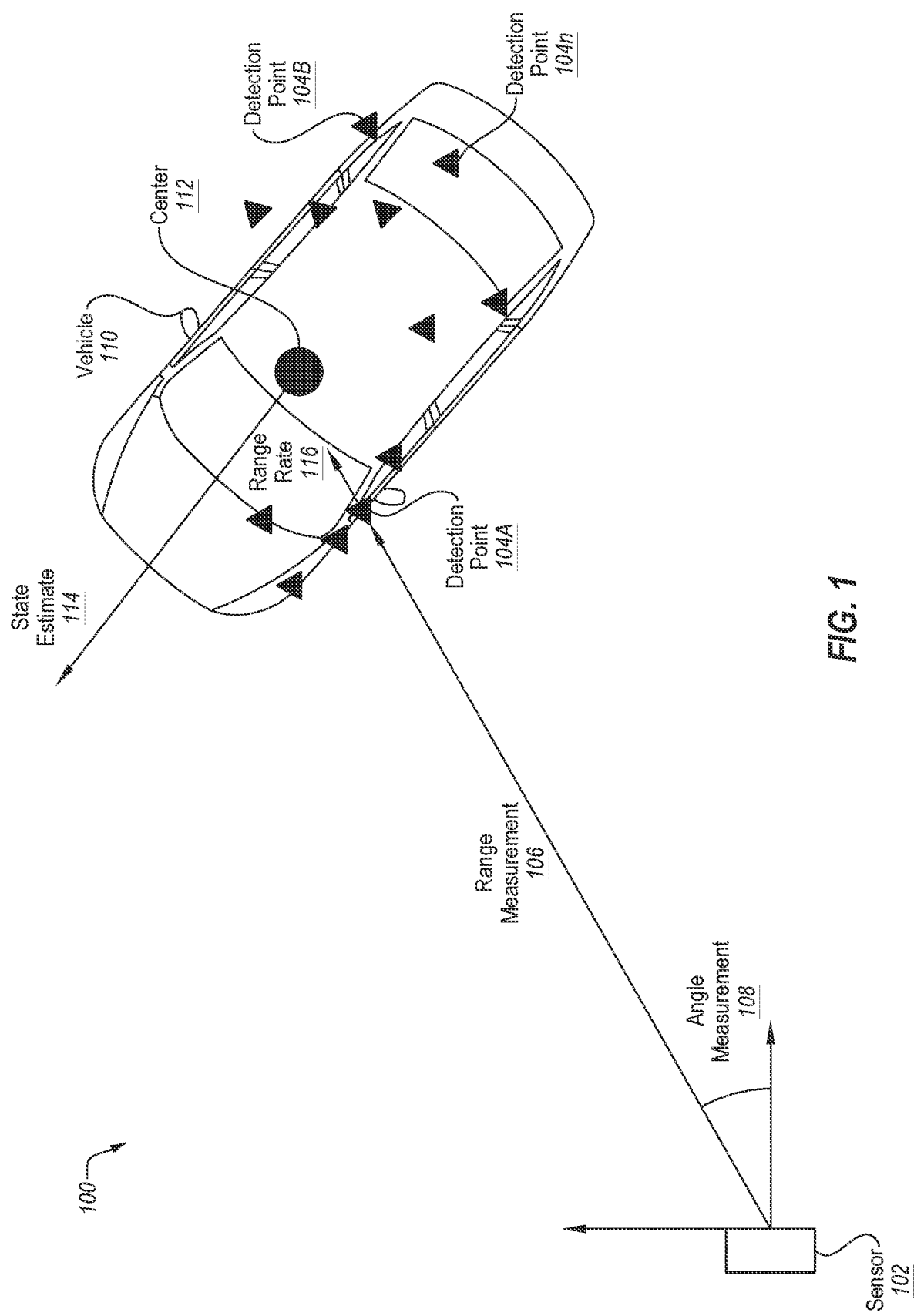
FIG. 1 is a diagram representing an example environment related to a sensor generating sensor data corresponding to one or more detection points corresponding to a vehicle. Additionally or alternatively, one or more state estimates corresponding to the vehicle may be determined or otherwise generated, in accordance with one or more embodiments of the present disclosure.

One or more embodiments in the present disclosure relate to generating one or more estimated range rates or velocities of an object or portions of an object. For example, operations may be performed to help account for discrepancies in range rate measurements corresponding to different portions of a same object that may be tracked using sensor data. For example, a modification may be made to Kalman filtering techniques with respect to determining an expected range rate that may be used in determining updated state estimates. In particular, rather than relying only on making an expected range rate determination based on velocity vector estimates included in the state estimates, the expected range rate determination may also be based on the angle measurements corresponding to the respective portions of the object.

The particular expected range rate determined using the angle measurements corresponding to respective portions of the object may better correspond to the actual range rate at the particular portion as compared to an expected range rate that may mainly correspond to the current state estimate of the object—which, for example, may correspond to the center of mass of the object. This improved correspondence may also result in the particular expected range rate being closer to the particular range rate measurement that corresponds to the particular portion. Such an improvement may provide for a more accurate velocity vector estimate that may be obtained by performing a Kalman update.

Therefore, rather than employing a traditional Kalman filtering technique in which expected sensor measurement determinations are performed only based on previous state estimates, the present disclosure also incorporates using some information from the sensor measurements as part of some expected measurement determinations (e.g., expected range rates). Such a technique may improve the tracking of objects that have multiple portions having respective measurements corresponding thereto by better accounting and compensating for differences between range rates at various portions. Further, the adjustment of the expected range rate determinations in this manner may be much simpler than, for example, other clustering techniques, which may help reduce computational costs and/or reduce errors that may be hard to identify due to complexities in the clustering techniques.

Additionally or alternatively, one or more embodiments in the present disclosure relate to determining one or more estimated positions of an object or portions of an object and/or residuals corresponding to the one or more estimated positions. In some embodiments described herein, position measurements of the sensor measurements may be filtered in a manner that improves the accuracy of the Kalman filtering techniques. Additionally or alternatively, expected positions may be determined in a manner that improves the accuracy of the Kalman filtering techniques. In some embodiments, the position measurements may be filtered such that the position estimates of the state estimates may correspond to and track a particular vertex corresponding to two edges of the object (e.g., a corner of the object). The tracked vertex of the object may correspond to the portion that is closest to the sensor and accordingly may correspond to the portion that may be within the best line of sight of the object. The tracked vertex may therefore be referred to as the "near vertex" or "reference vertex" and may correspond to sensor measurements that are relatively cleaner than those that correspond to other portions of the object.

In some embodiments, the expected position determinations and/or residuals that may be determined with respect to Kalman updates corresponding to the remaining position measurements may be based on one of the reference edges or the reference vertex. For example, a Kalman update may be performed with respect to a position measurement that is deemed as corresponding to the reference vertex. With respect to the Kalman update, an expected position corresponding to the Kalman update may be an expected position of the reference vertex. Additionally or alternatively, a position residual corresponding to the Kalman update may be determined as the difference between the expected position and the position measurement.

Therefore, rather than employing a traditional Kalman filtering technique in which expected position measurements and corresponding residuals are performed with respect to many noisy measurements and/or based on a clustered point (e.g., a centroid), the present disclosure incorporates using a bounding shape as a reference for making such determinations. Such a technique may improve the tracking of objects that have multiple portions having respective measurements corresponding thereto by using position measurements that are more likely to be more accurate and less noisy. Further, the adjustment of the expected positions and residuals in this manner may be much simpler than clustering techniques, which may help reduce computational costs and/or reduce errors that may be hard to identify due to complexities in the clustering techniques.

One or more of the embodiments disclosed herein may relate to generating estimated range rates, position measurements, and corresponding residuals that may be executed by ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous or semi-autonomous machine or vehicle 600 (alternatively referred to herein as "vehicle 600" or "ego-machine 600") described with respect to FIGS. 6A-6D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems that implement one or more language models, such as one or more large language models (LLMs) that process textual, audio, image, sensor, and/or other data types to generate one or more outputs, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Now referring to FIG. 1, FIG. 1 is a diagram representing an example environment 100 related to a sensor 102 generating sensor data corresponding to one or more detection points 104 corresponding to a vehicle 110. Additionally or alternatively, one or more state estimates 114 corresponding to the vehicle 110 may be determined or otherwise generated, in accordance with one or more embodiments of the present disclosure.

The sensor 102 may be configured to generate sensor data corresponding to the vehicle 110. In some embodiments, the sensor 102 may be configured to generate sensor data that may indicate one or more measurements corresponding to one or more movement characteristics corresponding to the vehicle 110 and/or one or more portions of the vehicle 110 (e.g., position measurements, velocity measurements, acceleration measurements, etc.). In these and other embodiments, while the vehicle 110 may be illustrated in FIG. 1, the vehicle 110 may be representative of one or more objects whose movement characteristics (e.g., position, velocity, acceleration, jerk, etc.) may be determined using sensor data that may have been generated using the sensor 102.

For example, the sensor 102 may include a RADAR sensor. Continuing the example, the RADAR sensor may be configured to transmit high-frequency radio waves toward the vehicle 110, the high-frequency radio waves may be reflected off of the vehicle 110 and/or portions of the vehicle 110 such that the high-frequency radio waves may return to one or more receivers corresponding to the RADAR sensor. Based on the high-frequency radio waves returned to the one or more receivers corresponding to the RADAR sensor, one or more properties, movement characteristics, and/or other information corresponding to the vehicle 110 may be determined—e.g., a position measurement, velocity measurement, acceleration measurement, etc. of the vehicle 110 and/or portions of the vehicle 110.

Although primarily described with respect to RADAR sensors and RADAR data, this is not intended to be limiting, and other sensor modalities and sensor data types may be implemented without departing from the scope of the present disclosure. For example, LiDAR, ultrasonic, image, depth, and/or other sensor modalities (and/or a combination or fusion thereof) may be implemented without departing from the scope of the present disclosure.

In these and other embodiments, sensor data generated using the sensor 102 may correspond to one or more detection points 104. In some embodiments, the one or more detection points 104 may correspond to RADAR scans performed in a particular environment. The detection points 104 may include points in the particular environment at which a RADAR signal is reflected back to a sensor 102 performing a corresponding RADAR scan. In some instances, a RADAR signal may reflect off multiple portions of objects such that multiple detection points corresponding to an associated RADAR scan may correspond to a same object (e.g., the vehicle 110). In some embodiments, the one or more detection points 104 may correspond to one or more portions of the vehicle 110. For example, sensor data corresponding to the detection point 104A may indicate one or more movement characteristics corresponding to a first portion of the vehicle 110. The sensor data corresponding to the detection point 104B may indicate one or more movement characteristics corresponding to a second portion of the vehicle 110. Further, sensor data corresponding to detection point 104$n$ may indicate one or more movement characteristics corresponding to an nth portion of the vehicle 110.

In some embodiments, sensor data corresponding to the one or more detection points 104 may be noisy relative to sensor data corresponding to one or more other detection points 104. For example, in the context of the sensor 102 being a RADAR sensor, the sensor 102 may transmit high-frequency waves toward the vehicle 110. Continuing the example, the radio waves may bounce directly off of the vehicle 110 back to one or more receivers corresponding to the sensor 102. Some radio waves may correspond to detections of reflections that may have bounced off the ground before and/or after striking some portion of the vehicle 110 thereby generating some sensor data that may include more noise than the radio waves reflected back to the receivers directly from the vehicle 110.

By way of example and not limitation, sensor data corresponding to a detection point on a side of the vehicle 110 facing away from the sensor 102 (e.g., detection point 104B) may include more noise than sensor data corresponding to one or more detection points 104 facing the sensor 102 (e.g., detection point 104A). Further, in some embodiments, one or more detection points 104 may correspond to objects, obstacles, and other areas around the vehicle 110 rather than corresponding to the vehicle 110 itself (e.g., rocks, barriers, signs, and other objects surrounding the vehicle 110). Noisy measurements corresponding to sensor data may be further described in the present disclosure, such as, for example, with respect to FIGS. 2A and 2B.

In some embodiments, the sensor data generated using the sensor 102 may indicate a location and/or a position of the vehicle 110 and/or one or more portions of the vehicle 110 relative to the sensor 102. In some embodiments, the position of the vehicle 110 and/or one or more portions of the vehicle 110 may be indicated using one or more range measurements 106 and/or one or more angle measurements 108 corresponding to the one or more detection points 104.

In some embodiments, the one or more range measurements 106 may indicate a distance between the one or more detection points 104 and the sensor 102 used to generate the sensor data. Additionally or alternatively, the angle measurement 108 may indicate an angle between the object (or the detected portion of the object) and the sensor 102. The range measurement 106 and the angle measurement 108 together may indicate a position of the vehicle 110 and/or portions of the vehicle 110. In some embodiments, the range measurement 106 and the angle measurement 108 may collectively be referred to as a position measurement corresponding to the one or more detection points 104 and/or a position measurement of the vehicle 110.

In some embodiments, the position of the vehicle 110 and/or the position of one or more portions of the vehicle 110 may be referenced based on the range measurement 106 and the angle measurement 108—e.g., such as in polar coordinates that are referenced from the position of the sensor 102. Additionally or alternatively, the range measurement 106 and the angle measurement 108 may be transformed into a different coordinate system, such as a cartesian coordinate system, by performing a transformation with respect to the range measurement 106 and the angle measurement 108.

For example, sensor data generated using the sensor 102 may indicate a first position corresponding to the detection point 104A where the first position may be referenced using a first range measurement 106 and a first angle measurement 108. Continuing the example, sensor data generated using the sensor 102 may indicate a second position corresponding to the detection point 104B where the second position may be referenced using a second range measurement 106 and a second angle measurement 108. Further continuing the example, sensor data generated using the sensor 102 may indicate an nth position corresponding to the detection point 104*n* where the nth position may be referenced using an nth range measurement 106 and an nth angle measurement 108.

Additionally or alternatively, sensor data corresponding to one or more detection points 104 may include a range rate measurement 116. In some embodiments, the range rate measurement 116 may indicate respective velocities at which the corresponding detection points 104 may be moving away from or toward the sensor 102 used to obtain the respective range rate measurement 116. In some embodiments, the range rate measurement 116 may include a velocity vector that may indicate a speed and direction. The velocity vector may be referenced with respect to the sensor 102 such that the directions may be along the same line as the corresponding range measurements 106. Further, the range rate measurement 116 may also be components of the actual velocities at the respective detection points 104 as a function of the angle measurements 108. The range rate measurement 116 may also be referred to as "radial velocity" measurements in the present disclosure. For example, sensor data generated using the sensor 102 may include a first range rate measurement 116 that may indicate a first radial velocity of the detection point 104A. Continuing the example, the sensor data generated using the sensor 102 may include a second range rate measurement 116 that may indicate a second radial velocity of the detection point 104B. In some embodiments, the first radial velocity and the second radial velocity may not be the same. In some embodiments, the range rate measurement 116 may describe and/or illustrate a radial velocity corresponding to one or more detection points 104 using a velocity vector in the same direction as the range measurement 106 vector.

In some embodiments, the one or more range measurements 106, the one or more angle measurements 108, and/or the one or more range rates 116 corresponding to one or more detection points 104 may be included in one or more state estimates 114 associated with the vehicle 110. In some embodiments, the state estimates 114 may provide one or more movement characteristics of the vehicle 110 and/or portions of the vehicle 110. For example, the state estimate 114 corresponding to the first detection point 104A may include a position estimate corresponding to the detection point 104A (e.g., a combination of the range measurement 106 and the angle measurement 108 corresponding to the detection point 104A). Additionally or alternatively, the state estimate 114 may include a velocity vector estimate corresponding to a speed and direction corresponding to one or more detection points 104—e.g., the range rate 116 of the one or more detection points 104.

In some embodiments, the state estimate 114 may correspond to the vehicle 110 as a whole in addition to or rather than the state estimate 114 corresponding to the one or more detection points 104. In some embodiments, the state estimate 114 corresponding to the vehicle 110 as a whole may include the state estimate corresponding to a center 112 of the vehicle. In these and other embodiments, the center 112 may include one or more of a geometric center, a center of mass, a centroid, a gravitational center of mass and/or volume of the vehicle 110, and/or other measurements indicating a center corresponding to the vehicle 110.

In some embodiments, the state estimate 114 corresponding to the center 112 of the vehicle 110 may be determined based on one or more movement characteristics corresponding to the one or more detection points 104. For example, the detection point 104A may correspond to a first range measurement 106, a first angle measurement 108, and/or a first range rate 116; the detection point 104B may correspond to a second range measurement 106, a second angle measurement 108, and/or a second range rate 116. Continuing the example, the state estimate 114 corresponding to the geometric center 112 of the vehicle 110 may be based on the first range measurement 106, the second range measurement 106, the first angle measurement 108, the second angle measurement 108, the first range rate 116, and/or the second range rate 116—e.g., a weighted average of the foregoing measurements.

In some embodiments, one or more measurements and/or estimated movement characteristic may be improved. For example, one or more estimations of the position, velocity, acceleration, etc. may be improved.

For instance, the state estimate 114 may include a position of the vehicle 110. Further, as indicated in the present disclosure, the position of the vehicle 110 and/or portions of the vehicle 110 may be determined and/or estimated based on a corresponding expected position, the one or more range measurements 106 and/or angle measurements 108 associated with sensor data corresponding to the one or more detection points 104—e.g., using one or more Kalman filtering techniques. In one or more embodiments of the present disclosure and as detailed herein, one or more residuals corresponding to the expected position and the measured position that may be used in determining the position of the vehicle 110 and/or portions of the vehicle 110 may be determined based on a bounding shape. In some embodiments, the bounding shape may correspond to or represent an estimation of a perimeter of the vehicle 110. In these and other embodiments, the estimating of the position of the vehicle 110 and/or one or more portions the vehicle 110 as well as the determining of the residuals based on the bounding shape may be described and/or illustrated further in the present disclosure, such as, for example, with respect to FIGS. 2A and 2B.

Additionally or alternatively, in some instances, the state estimate 114 may additionally include one or more velocity and/or range rate estimates corresponding to the vehicle 110. Further, as indicated in the present disclosure, one or more improvements may be made to the accuracy of the range rate estimation corresponding to the state estimate 114. In one or more embodiments of the present disclosure and as detailed herein, one or more expected range rates may be determined based both on velocity vector estimates corresponding to one or more range rates 116 and one or more corresponding angle measurements 108 associated with sensor data corresponding to one or more detection points 104. In these and other embodiments, the determining one or more expected range rates based on both the velocity vector estimates and the one or more corresponding angle measurements corresponding to one or more detection points 104 may be described and/or illustrated further in the present disclosure, such as, for example, with respect to FIGS. 4-5.

Figure 2A:
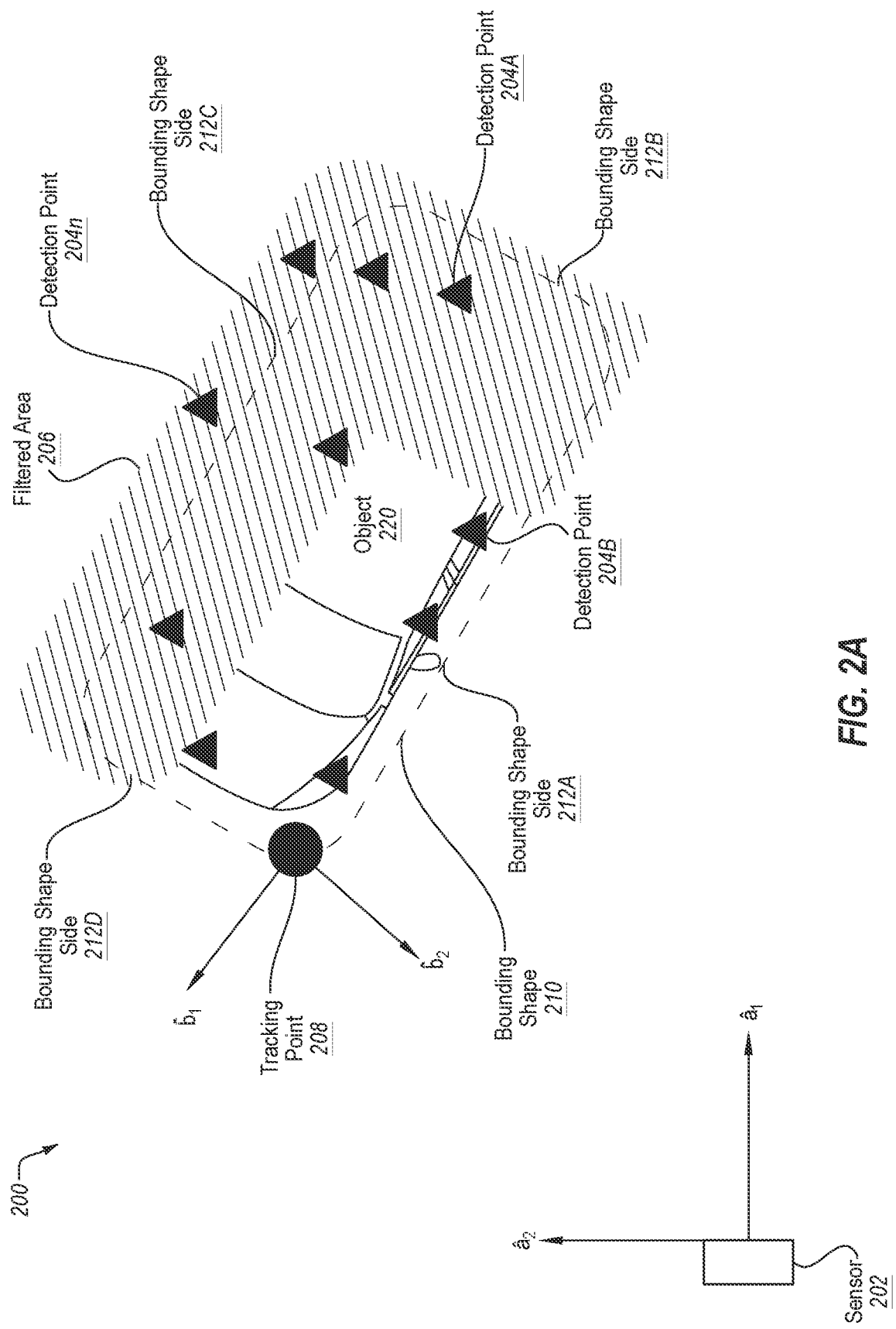
FIG. 2A is a diagram representing an example environment related to determining one or more positions corresponding to one or more detection points corresponding to an object, in accordance with one or more embodiments of the present disclosure.

FIG. 2A is a diagram representing an example environment 200 related to determining one or more positions corresponding to one or more detection points 204 corresponding to an object 220 in accordance with one or more embodiments of the present disclosure. In some embodiments, the operations described with respect to FIG. 2A may be performed using any suitable system, apparatus, or device. For example, the operations may be performed by one or more modules that may be implemented using one or more processors, central processing units (CPUs), graphics processing units (GPUs), data processing units (DPUs), parallel processing units (PPUs), microprocessors (e.g., to perform or control performance of one or more operations), programmable vision accelerators (PVAs)—which may include one or more direct memory access (DMA) systems and/or one or more vector or vision processing units (VPUs), field-programmable gate arrays (FPGA), application-specific integrated circuits (ASICs), accelerators (e.g., deep learning accelerators (DLAs)), and/or other processor types. In some other instances, one or more modules may be implemented using a combination of hardware and software. In these or other embodiments, one or more modules performing operations in the present disclosure may be implemented by one or more computing devices, such as that described in further detail with respect to FIGS. 6A-6D, 7, and/or 8.

As discussed in further detail in the present disclosure, the determining of the positions may be based on a tracking point 208 corresponding to a bounding shape 210, which may correspond to the object 220. Additionally or alternatively, the example environment 200 may be related to filtering out sensor data corresponding to one or more of the detection points 204 based on the bounding shape 210, in accordance with one or more embodiments of the present disclosure.

In some embodiments, the environment 200 may include a sensor 202. The sensor 202 may be configured to generate sensor data. In some embodiments, the sensor data may include one or more waves and/or signals that may be generated by the sensor 202 and/or received by one or more receivers corresponding to the sensor 202. In some embodiments, at least some of the sensor data that may generated using the sensor 202 may correspond to the object 220. In these or other embodiments, the sensor data may indicate one or more measurements corresponding to one or more movement characteristics corresponding to the object 220 and/or one or more portions of the object 220 (e.g., position measurements, velocity measurements, acceleration measurements, etc.). In some embodiments, the sensor 202 may be the same as and/or analogous to one or more sensors described and illustrated further in the present disclosure, such as, for example, with respect to FIGS. 1, 2B, and 4. For instance, in some embodiments, the sensor 202 may include a RADAR sensor, such as described in the present disclosure. However, in other embodiments, the sensor 202 may include another sensor modality, such as LiDAR, ultrasonic, etc., and/or any sensor type described herein—e.g., with respect to example autonomous or semi-autonomous vehicle or machine 400.

The object 220 may include one or more dynamic objects, items, systems, etc. whose movement characteristics (e.g., position, velocity, acceleration, jerk, etc.) may be determined using sensor data. In some embodiments, the object 220 may include one or more objects whose movement characteristics may be determined using data generated using one or more RADAR sensors—e.g., sensor 202. Further, in some embodiments and as described further in the present disclosure, the object 220 may include one or more objects whose position and/or one or more positions corresponding to one or more portions of the object 220 may be determined using the bounding shape 210. In these and other embodiments, the object 220 may include one or more objects, systems, etc. described further in the present disclosure, such as, for example, the vehicle 110 described with respect to FIG. 1.

In some embodiments, one or more detection points 204 may be associated with one or more portions of the object 220. In some embodiments, the one or more detection points 204 may correspond to sensor data from which one or more movement characteristics corresponding to the object 220 may be determined. For example, sensor data corresponding to one or more detection points 204 may include information corresponding to one or more position measurements, velocity measurements, acceleration measurements, etc. corresponding to one or more portions of the object 220.

In some embodiments, the one or more detection points 204 may correspond to different portions of the object 220. For example, detection point 204A may correspond to a first portion of the object 220, detection point 204B may correspond to a second portion of the object 220, up to and/or including detection point 204n that may correspond to an nth portion of the object 220. In some embodiments, sensor data corresponding to the detection points 204 may be used in determining corresponding movement characteristics corresponding to respective portions of the object 220. For example, sensor data corresponding to the detection point 204A may indicate one or more movement characteristics corresponding to a first portion of the object 220. The sensor data corresponding to the detection point 204B may indicate one or more movement characteristics corresponding to a second portion of the object 220. Further, sensor data corresponding to detection point 204n may indicate one or more movement characteristics corresponding to an nth portion of the object 220.

In these and other embodiments, the detection points 204 may include, be the same as, and/or be analogous to one or more other detection points described and/or illustrated in the present disclosure, such as, for example, with respect to FIG. 1.

In some embodiments, the detection points 204 and the sensor data corresponding thereto may be used to determine one or more states of the object 220 (e.g., the state estimate 114). In some embodiments, the one or more states of the object 220 may provide one or more movement characteristics of the object 220 and/or portions of the object 220. For example, the one or more states of the object 220 corresponding to the first detection point 204A may include a position estimate corresponding to the detection point 204A. Additionally or alternatively, the one or more states of the object 220 may include a velocity vector estimate corresponding to a speed and direction corresponding to one or more detection points 204. In some embodiments, sensor data corresponding to one or more detection points 204 may be more reliable and/or accurate in determining one or more of a position, velocity, acceleration, jerk, etc. of the object 220 and/or one or more portions of the object 220 as compared to sensor data corresponding to others of the one or more detection points 204 as described in the present disclosure, such as, for example, with respect to FIG. 1.

In some embodiments, the sensor data and measurements corresponding thereto may correspond to a sensor reference frame corresponding to the sensor 202. In these or other embodiments, the sensor reference frame may be used as the reference frame for describing position data corresponding to one or more points corresponding to the object 220 and detected using the sensor 202. For example, in some embodiments, one or more range measurements (e.g., range measurements 106), angle measurements (e.g., angle measurements 108), range rates (e.g., range rates 116), etc. may be characterized based on the sensor reference frame.

For example, sensor data corresponding to detection point 204A may be used to determine an estimated position corresponding to the first portion of the object 220. Continuing the example, the estimated position of the first portion of the object 220 may be based on a location relative to the sensor 202. The first portion of the object 220 may be located ten meters away from the sensor 202 in a direction corresponding to the positive "x" direction and the first portion of the object may be located three meters away from the sensor 202 in a positive "y" direction. Therefore, the estimated position corresponding to the first portion of the vehicle may therefore be indicated by a vector, 10x+3y In FIG. 2A the sensor reference frame is illustrated as unit vectors $\hat{a}_1$ and $\hat{a}_2$. As used in the present disclosure, a "unit vector" may include a vector indicating a magnitude of one unit in a particular direction. In some embodiments, the unit vectors may indicate one or more directions in vector space such that vectors corresponding to one or more portions of the object 220 may be indicated by one or more scaled versions of the unit vectors $\hat{a}_1$ and/or $\hat{a}_2$. Continuing the example of determining one or more locations associated with sensor data corresponding to one or more detection points 204, an estimated position corresponding to the first portion of the object 220 may be ten meters in a direction indicated by the unit vector $\hat{a}_1$. That is, in a positive x-direction where the x-direction is characterized based on the unit vector $\hat{a}_1$ corresponding to a position and/or orientation of the sensor 202. Correspondingly, the first portion of the object 220 may be three meters in the direction indicated by the unit vector $\hat{a}_2$, that is, in a positive y-direction where the y-direction is characterized based on the unit vector $\hat{a}_2$ corresponding to a position and/or orientation of the sensor 202. Therefore, the estimated position corresponding to the first portion of the vehicle may therefore be indicated using unit vectors $\hat{a}_1$ and $\hat{a}_2$, $10\hat{a}_1 + 3\hat{a}_2$.

In some embodiments, the bounding shape 210 may be determined. As used in the present disclosure, the bounding shape 210 may include one or more estimated locations corresponding to an outline, perimeter, circumference, and/or outer edge corresponding to the object 220. In some embodiments, the bounding shape 210 may represent an estimation of one or more positions corresponding to one or more edges, sides, and/or outer surfaces of the object 210. In these and other embodiments, the bounding shape 210 may include any number of shapes corresponding to the object 220 (e.g., square, rectangle, circle, oval, and other shapes or combinations thereof).

In some embodiments, the bounding shape 210 may be determined using one or more algorithms, systems, processes, and/or any other suitable techniques whereby an estimated location of a perimeter corresponding to the object 220 may be determined—e.g., one or more object localization algorithms, image learning algorithms, and/or other localization algorithms and deep learning techniques. In some embodiments, the bounding shape 210 may be determined and/or estimated based on sensor data corresponding to the one or more detection points 204. In some embodiments, the bounding shape 210 may be determined and/or estimated based on a combination of sensor data corresponding to the one or more detection points 204 in combination with one or more algorithms and/or processes that may be configured to estimate the bounding shape 210 corresponding to the object 220.

In some embodiments, the bounding shape 210 may include one or more sides corresponding to a perimeter of the object 220. For example, in the context of the object 220 being a vehicle (e.g., the vehicle 110), the bounding shape 210 may be estimated and/or determined to be rectangular or substantially rectangular where both sides of the vehicle, a front of the vehicle, and a rear of the vehicle may be estimated, determined, and/or represented as sides of the bounding shape 210. In some embodiments, the bounding shape 210 may include a first bounding shape side 212A, a second bounding shape side 212B, a third bounding shape side 212C, and a fourth bounding shape side 212D referred to herein collectively as "bounding shape sides 212". In these and other embodiments, the four sides to the bounding shape 210 are illustrative for purposes of FIG. 2A, in some embodiments, the bounding shape 210 may include any number of sides corresponding to the object 220.

In some embodiments, the bounding shape 210 may follow one or more locations corresponding to the object 210 through time. For example, the object 220 may be located at a first position at a first time stamp and the bounding shape 210 may be estimated at the first position corresponding to the object 220. Continuing the example, the object 220 may be located at a second position at a second time stamp and the bounding shape 210 may be estimated at the second position corresponding to the object 220.

In some embodiments, a tracking point 208 may be identified and/or determined. In some embodiments, the tracking point 208 may be a reference point corresponding to one or more locations on the bounding shape 210 that may be used in determining which portion of the object 220 may be used in determining an expected position. In some embodiments, the tracking point 208 may be associated with a location corresponding to the bounding shape 210 that may be nearest to the sensor 202. In some embodiments, the tracking point 208 may be associated with a location corresponding to the bounding shape 210 that may be both the nearest to the sensor 202 and that may be within a clear line of sight from the sensor 202. For example, the sensor data generated using the sensor 202 may rebound from a point on the object 220 that may correspond to the tracking point 208 and may have been received by one or more receivers corresponding to the sensor 202 without rebounding or bouncing off of one or more other objects, and/or obstacles.

In some embodiments, the tracking point 208 may be associated with a location corresponding to the bounding shape 210 that may be a corner or a vertex corresponding to one or more sides associated with the bounding shape 210. For example, the object 220 may include a vehicle (e.g., the vehicle 110 described further in the present disclosure, such as, for example, in FIG. 1). Further, the bounding shape 210 may include a rectangle where the front of the vehicle, back of the vehicle, and both sides of the vehicle correspond to the four sides of the bounding shape 210. The tracking point 208 associated with the bounding shape 210 corresponding to the vehicle may be one or more of the corners of the substantially rectangular bounding shape 210 where the one or more corners may include one or more vertices where two or more sides corresponding to the bounding shape 210 may intersect.

In some embodiments, the tracking point 208 may change depending on one or more locations corresponding to the object 220. For example, the tracking point 208 may be determined at a first location corresponding to the bounding shape 210 at a first time stamp. Continuing the example, at a second time stamp, the object 220 may have moved to a second location, the bounding shape 210 may be estimated at the second time stamp to correspond to the second location of the object 220. Further, the tracking point 208 may be determined to be associated with the bounding shape 210 corresponding to the object 220 at the second location at the second time stamp.

In some embodiments, a tracking point reference frame may be determined corresponding to the tracking point 208. As illustrated in FIG. 2A, the tracking point reference frame may be illustrated using unit vectors $\hat{b}_1$ and $\hat{b}_2$ where the unit vectors may indicate a magnitude of one unit in a particular direction. In some embodiments, $\hat{b}_1$ may represent the positive "x" direction and $\hat{b}_2$ may represent the positive "y" direction. In some embodiments, the unit vectors $\hat{b}_1$ and $\hat{b}_2$ may indicate one or more directions in vector space such that vectors corresponding to one or more movement characteristics local to the tracking point 208 associated with the object 220 may be indicated using one or more scaled versions of the unit vectors $\hat{b}_1$ and/or $\hat{b}_2$.

In some embodiments, the unit vectors $\hat{b}_1$ and $\hat{b}_2$ may represent a local x-direction and a local y-direction corresponding to the tracking point 208 associated with the object 220. In some embodiments, the local x-direction corresponding to unit vector $\hat{b}_1$ and the local y-direction corresponding to the unit vector $\hat{b}_2$ may be indicated as components of an x-direction corresponding to unit vector $\hat{a}_1$ and a y-direction corresponding to unit vector $\hat{a}_2$ based on one or more transformations, such as, for example, illustrated in example equations:

$$\hat{b}_1 = \cos(\emptyset)\hat{a}_1 + \sin(\emptyset)\hat{a}_2 \quad (1)$$

$$\hat{b}_2 = -\sin(\emptyset)\hat{a}_1 + \cos(\emptyset)\hat{a}_2 \quad (2)$$

where $\hat{b}_1$ is the unit vector in the local x-direction corresponding to the tracking point 208, $\hat{b}_2$ is the unit vector in the local y-direction corresponding to the tracking point 208, and where the angle "ø" may be defined by components of velocity (e.g., velocity in the x-direction $v_x$ and velocity in the y-direction $v_y$) corresponding to one or more points on the object and/or points corresponding to the bounding box, e.g., the tracking point 208. For example, angle ø may be defined as:

$$\emptyset = \tan^{-1}\left(\frac{v_x}{v_y}\right) \quad (3)$$

where $v_x$ indicates velocity in the x-direction and $v_y$ indicates velocity in the y-direction corresponding to one or more measured points that may correspond to the one or more detection points 222.

Further, in some embodiments, a transformation matrix may relate the sensor reference frame and the tracking point reference frame defined as follows:

$$T = \begin{bmatrix} \cos\emptyset & \sin\emptyset \\ -\sin\emptyset & \cos\emptyset \end{bmatrix} \quad (4)$$

where T represents the transformation matrix corresponding to the sensor reference frame, and where the angle "ø" may be defined by components of velocity corresponding to one or more points on the object and/or points corresponding to the bounding shape 210.

In some embodiments, the tracking point reference frame may be identified and/or determined corresponding to the tracking point 208 at one or more time stamps corresponding to changes in location of the object 220, the location of the bounding shape 210, and the location of the object 220.

In some embodiments, one or more locations corresponding to the tracking point 208 may be determined. In some embodiments, the one or more locations may be determined relative to the sensor 202 and/or the sensor reference frame indicated using unit vectors $\hat{a}_1$ and $\hat{a}_2$. In some embodiments, the one or more locations may be represented by a vector $\vec{r}^{AB}$ that may be defined as:

$$\vec{r}^{AB} = x\hat{a}_1 + y\hat{a}_2 \quad (5)$$

where $\vec{r}^{AB}$ represents a position vector corresponding to the tracking point 208 where the vector tail may be located at the sensor and the vector head at the tracking point 208. Where $\hat{a}_1$ represents a unit vector in the local x-direction corresponding to the sensor reference frame and $\hat{a}_2$ represents a unit vector in the local y-direction corresponding to the sensor reference frame and where "x" and "y" represent cartesian coordinates indicating a location corresponding to the tracking point 208.

In some embodiments, sensor data corresponding to the one or more detection points 204 may be noisy relative to sensor data corresponding to one or more other detection points 204. In some embodiments, the noisy sensor data corresponding to one or more detection points 204 may be less reliable than other sensor data corresponding to one or more other detection points 204. In these and other embodiments, noisy measurements may be described and/or illustrated further in the present disclosure, such as, for example, in FIG. 1.

In some embodiments, because one or more detection points 204 may correspond to noisy sensor data, using detection points 204 corresponding to non-noisy sensor data and/or sensor data that may be less noisy compared to other sensor data may increase the accuracy of determining and/or estimating one or more measurements associated with a state of the object 220 (e.g., position, velocity, acceleration, etc.). In some embodiments, determining and/or estimating one or more measurements associated with the object 220 may accordingly help in determining a more accurate state estimate corresponding to the object 220. As indicated in the present disclosure, in some embodiments, the sensor data may be filtered such that more noisy sensor data corresponding to one or more respective detection points 204 may be removed from use in determining one or more characteristics of the state estimate corresponding to the object 220.

In some embodiments, sensor data corresponding to one or more detection points 204 may be filtered out to estimate more accurately, for example, a position corresponding to the object 220 and/or one or more portions of the object 220. In some embodiments, sensor data corresponding to one or more detection points 204 (e.g., detection point 204A and/or detection point 204n) may be filtered out and therefore not considered in a state estimate of a position of the object 220. For example, the sensor data corresponding to detection points 204A and/or 204n may be noisier and therefore less accurate and/or reliable as compared to sensor data corresponding to detection point 204B.

In some embodiments, sensor data corresponding to one or more detection points 204 may be filtered out based on a location of the bounding shape 210 corresponding to the tracking point 208. In some embodiments, the sensor data corresponding to one or more detection points 204 may be filtered out based on one or more detection points 204 corresponding to locations within a threshold distance of one or more portions of the bounding shape 210.

For example, as illustrated in FIG. 2A, the tracking point 208 may be associated with a location corresponding to a vertex of the bounding shape 210 nearest the sensor 202. Continuing the example, edges corresponding to the bounding shape 210 and associated with the tracking point 208 may include portions of the object 220 where sensor data corresponding to one or more detection points 204 may be less noisy than sensor data corresponding to one or more other detection points 204 corresponding to one or more other portions of the object 220. Further, sensor data corresponding to one or more detection points 204 may be filtered out based on the sensor data corresponding to one or more locations inside a filtered area corresponding to the bounding shape 210 and corresponding to the tracking point 208.

In some embodiments, the filtered area 206 may indicate an area corresponding to the bounding shape 210 where sensor data corresponding to one or more detection points 204 may be filtered out. In some embodiments, as illustrated in the present disclosure, the filtered area 206 may be defined as an area and/or one or more locations outside of a threshold distance corresponding to portions of edges of the bounding shape 210. For example, sensor data outside of a threshold distance (e.g., 0.5 meters, 25 cm, etc.) from a portion of the edges corresponding to the bounding shape 210 may be filtered out. In some embodiments, the filtered area 206 may be defined as an area and/or one or more locations located outside of a threshold distance corresponding to the tracking point 208.

In some embodiments, sensor data corresponding to one or more detection points 204 may be filtered out based on the filtered area 206 being defined and/or determined to be a threshold distance from the tracking point 208. For example, sensor data corresponding to one or more detection points may be filtered out if the sensor data corresponds to a location inside the filtered area 206, defined as an area within the bounding shape 210 and outside a one-meter circumference of the tracking point 208, for example.

In some embodiments, sensor data corresponding to one or more detection points 204 may be filtered out based on location data corresponding to the detection points 204 being within a threshold distance of one or more bounding shape sides 212 that may not correspond to the tracking point 208. For example, in the context of the bounding shape 210 being substantially rectangular, the tracking point 208 may correspond to a vertex corresponding to the first bounding shape side 212A and the second bounding shape side 212B. Further, the third bounding shape side 212C and the fourth bounding shape side 212D may not correspond to the tracking point 208. Sensor data corresponding to one or more detection points 204 may be filtered out based on location data corresponding to one or more detection points 204 being within a threshold distance (e.g., one meter) of the third bounding shape side 212C and the fourth bounding shape side 212D.

In some embodiments, the filtered area 206 may be defined and/or determined based on one or more heuristic analyses. For example, filtering out sensor data may be determined based on one or more locations of the sensor data being outside of 0.5 meters from the first bounding shape side 212A and the second bounding shape side 212B.

In some embodiments, the filtered area 206 may be defined and/or determined based on a percentage of the object 220. For example, the filtered area 206 may correspond to 60% of the area corresponding to the object 220 and/or the corresponding bounding shape 210.

In some embodiments, the filtered area 206 may be defined and/or determined based on an orientation of the object 220 in relation to the sensor 202. For example, the object 220 may be oriented directly in front of the sensor 202 such that the first bounding shape side 212A may be exposed to the sensor 202. Continuing the example, the filtered area 206 may be defined based on a threshold distance away from the first bounding shape side 212A corresponding to the side of the object 210 exposed to the sensor 202.

In some embodiments, the filtered area 206 may be defined and/or determined based on an accuracy corresponding to the sensor 202. For example, a smaller threshold distance may be determined between one or more bounding shape sides 212 and the filtered area 206 for the sensor 202 being rated to generate sensor data that may indicate one or more locations accurate to ± one centimeter as compared to the sensor 202 being rated to generate sensor data that may indicate one or more locations accurate to ±0.5 meters.

In these and other embodiments, some sensor data corresponding to one or more detection points 204 may remain after filtering out sensor data corresponding to one or more other detection points 204. In some embodiments, the remaining sensor data may be used to determine an estimated location corresponding to the object 220. Additionally or alternatively, the remaining sensor data may be used to determine an estimated location corresponding to one or more portions of the object 220 as described and illustrated further in the present disclosure, such as, for example, with respect to FIG. 2B.

Figure 2B:
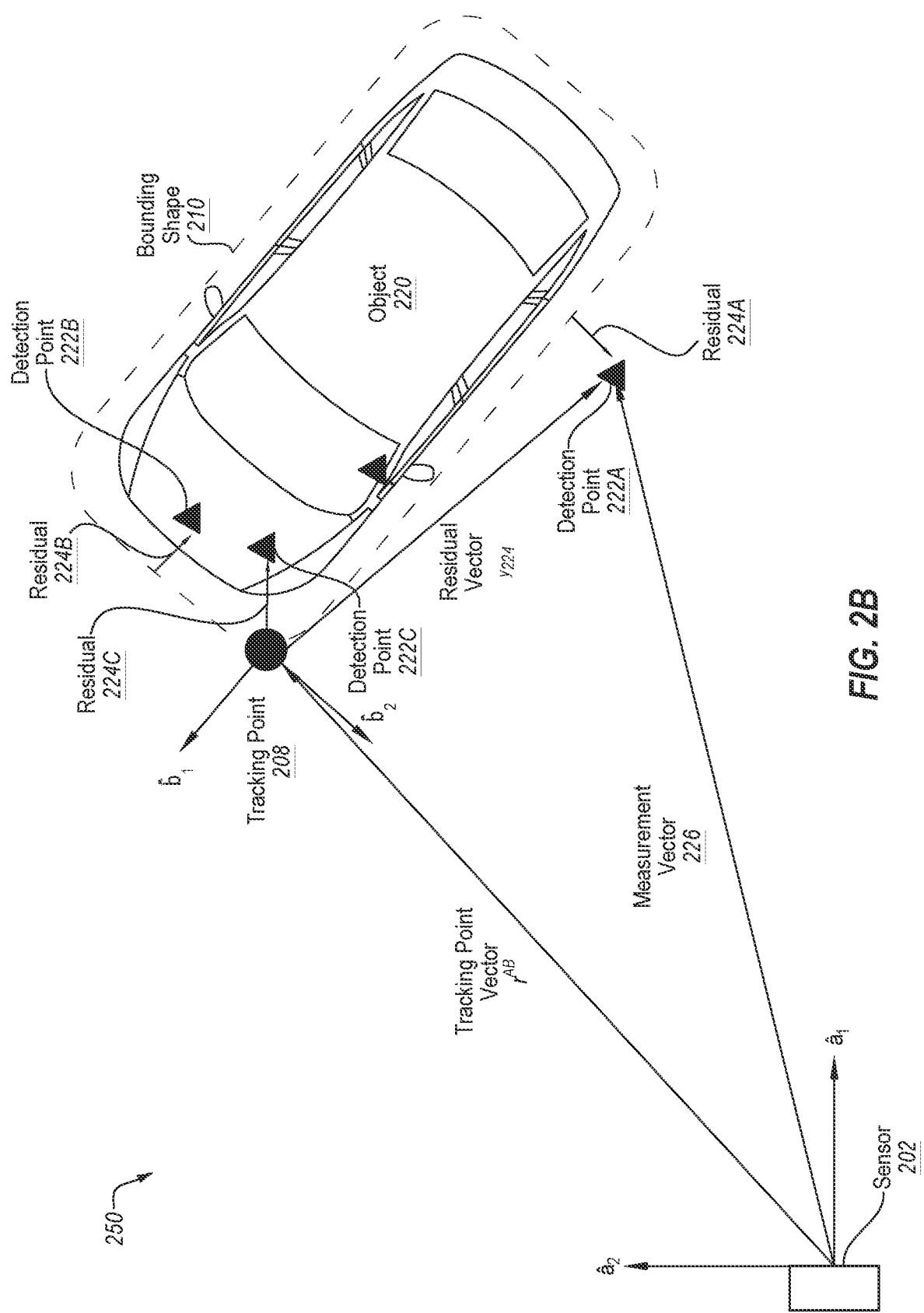
FIG. 2B is a diagram representing an example environment related to determining one or more expected positions and/or one or more residuals corresponding to one or more detection points, in accordance with one or more embodiments of the present disclosure.

FIG. 2B is a diagram representing an example environment 250 related to determining one or more expected positions and/or one or more residuals 224 corresponding to one or more detection points 222, in accordance with one or more embodiments of the present disclosure. In the illustrated example, the bounding shape 210 and the tracking point 208 may correspond to the object 220 described with respect to FIG. 2A. In some embodiments, the operations described with respect to FIG. 2B may be performed using any suitable system, apparatus, or device. For example, the operations may be performed by one or more modules that may be implemented using one or more processors, central processing units (CPUs) graphics processing units (GPUs), data processing units (DPUs), parallel processing units (PPUs), microprocessors (e.g., to perform or control performance of one or more operations), PVAs, field-programmable gate arrays (FPGA), application-specific integrated circuits (ASICs), accelerators (e.g., deep learning accelerators (DLAs)), and/or other processor types. In some other instances, one or more modules may be implemented using a combination of hardware and software. In these or other embodiments, one or more modules performing operations in the present disclosure may be implemented by one or more computing devices, such as that described in further detail with respect to FIGS. 6A-6D, 7, and/or 8.

In some embodiments, the one or more detection points 222 may be the same as and/or analogous to detection points described and illustrated further in the present disclosure, such as, for example, with respect to FIGS. 1 and 2A.

In some embodiments, sensor data corresponding to the one or more detection points 222 may be the sensor data remaining after sensor data corresponding to one or more detection points 204 may have been filtered out using the filtering module 210. In these and other embodiments, the sensor data corresponding to the detection points 222 may correspond to sensor data that may be less noisy relative to other sensor data corresponding to one or more other detection points—e.g., one or more detection points 204. In some embodiments, sensor data corresponding to the one or more detection points 222 may not have gone through one or more filtering processes corresponding to, for example, the filtering module 210.

In some embodiments, the detection points 222 may correspond to sensor data associated with one or more portions of the object 220. In some embodiments, one or more locations associated with the detection points 222 may correspond to one or more bounding shape sides 212 and/or the tracking point 208. In some embodiments, for example, sensor data corresponding to the detection point 222A may indicate that, compared with other bounding shape sides 212, the detection point 222A may be closest to the bounding shape side 212A. In some embodiments, the bounding shape side 212A that may be closest to the detection point 222A may be referred to as the "side edge." In some embodiments, the bounding shape side 212A may be referred to as the side edge because the bounding shape side 212A may correspond to a side of the object 220 (as opposed to the front and/or back of the object 220) that may be in the line of sight of the sensor 202.

In some embodiments, sensor data corresponding to the detection point 222B may indicate one or more locations that, compared with other bounding shape sides 212, the detection point 222B may be closest to the bounding shape side 212D. In some embodiments, the bounding shape side 212D that may be closest to the detection point 222B may be referred to herein as "the front edge." In some embodiments, the side edge 212D may be referred to as the front edge because the bounding shape side 212B may correspond to the front of the object 220 (as opposed to the sides and/or back of the object 220) that may be in the line of sight of the sensor 202. In some embodiments, the front edge and the side edge corresponding to the bounding shape 210 may be used to determine one or more residuals associated with sensor data corresponding to one or more detection points 222.

In some embodiments, the position, as indicated based on the sensor data and corresponding to the one or more detection points 222, may be referred to in the present disclosure as a measured position. In some embodiments, the detection points 222 may correspond to different respective measured positions. For example, the detection point 222A may correspond to sensor data indicating a first measured position, the detection point 222B may correspond to sensor data indicating a second measured position, up to and including the detection point 222C that may correspond to sensor data indicating a third measured position. While illustrated in FIG. 2A as three detection points 222, there may be any number of detection points and associated measured positions corresponding to the object 220.

In some embodiments, the one or more measured positions may be expressed as a vector corresponding to the sensor frame of reference characterized by unit vectors $\hat{a}_1$ and $\hat{a}_2$. In some embodiments, the position measurement corresponding to the detection point 222A may correspond to a measurement vector 226, also expressed herein as "$\vec{z}$." In some embodiments, the one or more measurement vectors may be defined using cartesian coordinates corresponding to the sensor frame of reference, that is, the "x" and "y" position measurements corresponding to the sensor 202. The measurement vectors 226 may be defined as:

$$\vec{z} = z_x \hat{a}_1 + z_y \hat{a}_2 \qquad (6)$$

Where "$\vec{z}$" may correspond to a vector from the sensor 202 and one or more measured positions that may correspond to the detection points 222. $z_x$ and $z_y$ may correspond to local x and y components respectively corresponding to the vector z, and where $\hat{a}_1$ represents a unit vector in the local x-direction corresponding to the sensor reference frame and $\hat{a}_2$ represents a unit vector in the local y-direction corresponding to the sensor reference frame.

While one vector $\vec{z}$ may be illustrated in FIG. 2B, one or more position measurements corresponding to detection point 222B and detection point 222C may also be characterized by similarly defined vectors using cartesian coordinates corresponding to the sensor frame of reference.

In some embodiments, one or more Kalman filtering techniques may be used to iteratively determine one or more "expected" or "anticipated" positions corresponding to the expected state of the object 220. In some embodiments, the one or more Kalman filtering techniques may proceed iteratively through one or more Kalman update operations to determine one or more expected positions corresponding to the state of the object 220.

In some embodiments, the one or more Kalman update operations may use the measured positions that may correspond to locations associated with the detection points 222 and expected positions that may be determined using the bounding shape 210. In some embodiments, the one or more measured positions may correspond to locations where sensor data may have bounced off of the object 220. In some embodiments, the locations corresponding to the sensor data may include locations corresponding to one or more detection points 222.

In some embodiments, the expected positions may be determined based on the bounding shape 210. In some embodiments, one or more expected positions may be determined based on the bounding shape 210 and one or more locations corresponding to the detection points 222. In some embodiments, a determination may be made as to whether the expected position corresponds to the front edge, the side edge, or the tracking point 208. In some embodiments, the expected position may correspond to the tracking point 208 where the measured position is determined to be at a location within a particular area surrounding the tracking point 208 (e.g., within a predetermined circumference of the tracking point 208).

In some embodiments, the measured position may be outside of the area corresponding to the tracking point 208. The expected position may then correspond to the side edge or the front edge of the bounding shape 210 based on the location corresponding to the measurement position (e.g., the location corresponding to the one or more detection points 222). In some embodiments, based on the determination that the expected position may be on either the side edge or the front edge of the bounding shape 210, one or more points along or near the side edge and/or the front edge may be determined to be the expected position corresponding to the measured position. In some embodiments, the expected position may be the location on the bounding shape 210 nearest the detection point 222.

By way of example and not limitation, the detection point 222B may correspond to sensor data that may have bounced off of the object 220. Continuing the example, the expected position corresponding to the object 220 and corresponding to the detection point 222B may be the point on the bounding shape 210 nearest the detection point 222B. In FIG. 2B, the point indicated using the arrow between the bounding shape 210 and the detection point 222B may be the expected position corresponding to the detection point 222B.

In some embodiments, the one or more measured positions and the one or more expected positions along with one or more residuals 224, one or more corresponding state-to-measurement residual matrices H (described, for example, with respect to equation 13), and one or more measurement noise covariance determinations (described, for example, with respect to equation 28) may be used in one or more Kalman filter update operations to determine a location of the object 220. In some embodiments, the location of the object 220 may be included in the state of the object 220 at a particular time stamp.

In some embodiments, the one or more expected positions may be determined with respect to the bounding shape 210 as opposed to, for example, a centroid or center of mass corresponding to the object. In some embodiments, this technique may improve the accuracy and efficiency in determining positions corresponding to one or more expected states of the object 220 using one or more Kalman filtering techniques as described with more particularity herein. Additionally or alternatively, one or more residuals 224 may be determined based on the bounding shape 210 and the one or more residuals 224 may be used in the one or more Kalman filtering techniques to determine expected positions corresponding to one or more states of the object 220 using one or more Kalman update operations. In some embodiments, the one or more Kalman update operations may include determining a Kalman gain that may factor into determining the one or more expected positions corresponding to the object 220.

In some embodiments, the Kalman gain as referred to herein may indicate the extent to which the sensor measurements may be factored into updating the state of the object 220. For example, a high Kalman gain may indicate that more weight may be placed on the measured positions— e.g., one or more measurement characteristics corresponding to the detection points 222. A low Kalman gain, conversely may indicate that more weight may be placed on the expected measurements that may be determined, for example, based on the bounding shape 210.

In addition to determining one or more measured positions and/or expected positions, one or more corresponding residuals 224 may be determined and/or used in one or more Kalman update operations. In some embodiments, the one or more residuals 224 may be determined based on the one or more measured positions associated with the detection points 222. In some embodiments, the one or more residuals 224 may represent a difference between one or more measured positions (e.g., one or more locations corresponding to detection points 222) and one or more expected positions corresponding to the object 220. For example, one or more expected positions may be determined based on one or more locations corresponding to the tracking point 208, the side edge, and/or the front edge of the bounding shape 210 as illustrated in FIG. 2B. While illustrated herein as the side edge and the front edge, the one or more residuals may be determined based on any side corresponding to the bounding shape 210 based on the shape of the object 220, an orientation associated with the object 220 in relation to the sensor 202, etc.

In some embodiments, the residuals 224 may be determined based on differences in location corresponding to the expected positions along the sides of the bounding shape 210 and the measured positions corresponding to the detection points 222. In some embodiments, the residual 224A may be determined based on a difference between one or more locations corresponding to the detection point 222A and one or more expected locations that may be determined based on the side edge of the bounding shape 210. In some embodiments, where it is determined that the measured position is outside an area surrounding the tracking point 208, it may be determined that the expected position may be the location on the side edge of the bounding shape 210. In some embodiments, the expected position may be determined to be a location along the side edge of the bounding shape 210 because the location corresponding to the measured position may be closer to one or more points along the side edge as compared to one or more points along the front edge of the bounding shape 210. In some embodiments, the expected position may be the location nearest the detection point 222A.

In some embodiments, the residual 224B may be determined based on a difference between one or more locations corresponding to the detection point 222B and a corresponding expected position that may be determined based on the bounding shape 210. In some embodiments, where it is determined that the measured position is outside an area surrounding the tracking point 208, it may be determined that the expected position may be the location on the front edge of the bounding shape 210. In some embodiments, the expected position may be determined to be a location along the front edge of the bounding shape 210 because the location corresponding to the measured position may be closer to one or more points along the front edge as compared to one or more points along the side edge of the bounding shape 210. In some embodiments, the expected position may be the location on the bounding shape 210 nearest the location of the detection point 222B. Further, the residual 224C may be determined based on a difference between one or more locations corresponding to the detection point 222B and a corresponding expected position that may be determined based on the bounding shape 210.

In some embodiments, the expected position may be a point on the bounding shape corresponding to the tracking point 208 based on the measured position being within a particular area surrounding the tracking point 208. In some embodiments, the tracking point 208 may be the point on the bounding shape 208 nearest the location corresponding to the detection point 222C. In some embodiments, the tracking point 208 may not be the point on the bounding shape 210 nearest the location corresponding to the detection point 222C. However, the detection point 222C may be located within a predetermined area surrounding the tracking point 208 and, therefore, the location corresponding to the tracking point 208 may be the expected position corresponding to the detection point 222C. For example, as used in the present disclosure, the expected position corresponding to the detection point 222C may be the tracking point 208.

In some embodiments, the difference between the one or more measured positions and the one or more corresponding expected positions may be represented as a residual vector $\vec{y}_{224}$. In some embodiments, the residual vector $\vec{y}_{224}$ may correspond to a difference between one or more locations corresponding to one or more detection points 222 and the bounding shape 210. For example, residual 224A may be represented as the difference between a measured position corresponding to the detection point 222A and an expected position corresponding to the bounding shape 210.

In some embodiments, one or more residual vectors $\vec{y}_{224}$ may be determined based on the tracking point 208. In some embodiments, the tracking point 208 may be used as a point in the tracking point reference frame to help determine one or more residuals 224 corresponding to the front edge and/or the side edge of the bounding shape 210. In some embodiments, the residual vector $\vec{y}_{224}$ may be determined where one or more components of the residual vector $\vec{y}_{224}$ correspond to the magnitude of the one or more residuals 224 in a direction perpendicular to the side edge or the front edge of the bounding shape 210.

By way of example and not limitation, one or more equations corresponding to determining one or more residual vectors (e.g., equations 7-9) may be defined with respect to the one or more sides of the bounding shape 210. In some embodiments, the one or more residual vectors $\vec{y}_{224}$ may be determined based on whether the one or more residuals 224 correspond to an expected position determined based on the side edge, the front edge, or the tracking point 208 corresponding to the bounding shape 210. For example, in some embodiments, $\vec{y}_{224A}$ may be a residual vector corresponding to the residual 224A that may be associated with the side edge of the bounding shape 210. The $\vec{y}_{224B}$ may be a residual vector corresponding to the residual 224B that may be associated with the front edge of the bounding shape 210. The residual vector $\vec{y}_{224C}$ may be a residual vector corresponding to the residual 224C that may be associated with the tracking point 208 corresponding to the bounding shape 210.

In some embodiments, the residual vector may correspond to one or more expected positions and one or more measured positions which may be represented as one or more residuals 224. In some embodiments, one or more residuals 224 may be determined by subtracting the tracking point vector $\vec{r}^{AB}$ (determined, for example, with respect to equation 5) from the measurement vector "$\vec{z}$." corresponding to the vector from the sensor 202 to the one or more detection points 222.

For example, the residual vector corresponding to the residual 224A that may be determined based on an expected position corresponding to the side edge of the bounding shape 210 may be represented by the following equation:

$$\vec{y}_{224A} = \vec{z}_{222A} - \vec{r}^{AB} \qquad (7)$$

Where $\vec{y}_{224A}$ represents a residual vector $\vec{y}_{224}$ corresponding to the detection point 222A and the residual 224A. "$\vec{z}$."$_{222A}$ indicates a position vector corresponding to the detection point 222A from the sensor 202, and $\vec{r}^{AB}$ represents a position vector corresponding to the tracking point 208 where the vector tail may be located at the sensor and the vector head at the tracking point 208.

Further, the residual vector $\vec{y}_{224}$ corresponding to the residual 224B that may be determined based on an expected position corresponding to the front edge of the bounding shape 210 may be represented by the following equation:

$$\vec{y}_{224B} = \vec{z}_{222B} - \vec{r}^{AB} \qquad (8)$$

Where $\vec{y}_{224B}$ represents a residual vector $\vec{y}_{224}$ corresponding to the detection point 222B and/or the residual 224B. "$\vec{z}$."$_{222B}$ indicates a position vector corresponding to the detection point 222B from the sensor 202, and $\vec{r}^{AB}$ represents a position vector corresponding to the tracking point 208 where the vector tail may be located at the sensor and the vector head at the tracking point 208.

In some embodiments, the residual vector corresponding to the residual 224C that may be determined based on an expected position corresponding to the tracking point 208 of the bounding shape 210 may be represented by the following equation:

$$\vec{y}_{224C} = \vec{z}_{222C} - \vec{r}^{AB} \qquad (9)$$

Where $\vec{y}_{224C}$ represents a residual vector $\vec{y}_{224}$ corresponding to the detection point 222C and/or the residual 224C. "$\vec{z}$."$_{222C}$ indicates a position vector corresponding to the detection point 222C from the sensor 202, and $\vec{r}^{AB}$ represents a position vector corresponding to the tracking point 208 where the vector tail may be located at the sensor and the vector head at the tracking point 208.

In these and other embodiments, residual vectors $\vec{y}_{224}$ similar to those defined with respect to equations 7-9 may be determined with respect to the tracking point 208. Further, the residual 224 may indicate a difference between one or more measured positions and expected positions corresponding to one or more sides of the bounding shape 210—e.g., the front edge or the side edge.

In some embodiments, the magnitudes of one or more of the residuals 224 may be determined based on one or more unit vectors corresponding to the bounding shape reference frame (e.g., equations 10-12). In some embodiments, the residual vectors $\vec{y}_{224}$ determined using, for example, equations 7-9 may represent a vector with two components, one component in a direction corresponding to a local x and another component in a direction corresponding to a local y corresponding to the tracking point reference frame. The local x direction corresponding to unit vector $\hat{b}_1$ and the local y direction corresponding to unit vector $\hat{b}_2$. In some embodiments, depending on whether the residual vector $\vec{y}_{224}$ corresponds to a residual 224 corresponding to the side edge of the bounding shape 210 or corresponding to the front edge of the bounding shape 210. In some embodiments, a component of a residual vector $\vec{y}_{224}$ corresponding to a front edge of the bounding shape 210 may represent the magnitude of the particular residual in a direction perpendicular to the front edge of the bounding shape 210. Similarly, in some embodiments, a component of a residual vector $\vec{y}_{224}$ corresponding to the side edge of the bounding shape 210 may represent a magnitude of the particular residual in a direction perpendicular to the side edge of the bounding shape 210. Further, in some embodiments, one or more components of one or more residual vectors corresponding to the tracking point 208 may represent the magnitude of a particular residual in a direction corresponding to the unit vectors associated with the tracking point reference frame e.g., unit vectors $\hat{b}_1$ and $\hat{b}_2$.

In some embodiments, because the one or more residuals corresponding to the bounding shape 210 may be determined with respect to the one or more unit vectors corresponding to the tracking point reference frame, the residuals 224 may be represented as scalar values.

For example, the magnitude of a component of the residual vector $\vec{y}_{224A}$ in a direction perpendicular to the bounding shape 210 defined with respect to equation 7 may be determined. Because the side edge of the bounding shape 210 aligns with unit vector $\hat{b}_1$, performing a dot product using the residual vector $\vec{y}_{224A}$ and the unit vector $\hat{b}_2$ may result in the magnitude of the component of the residual 224A in a direction perpendicular to the side edge of the bounding shape 210 (e.g., in the direction corresponding to unit vector $\hat{b}_2$). In some embodiments, the equation corresponding to the residual 224A may be defined as:

$$Y_{224A} = \vec{y}_{224A} \cdot \hat{b}_2 \quad (10)$$

Where $Y_{224A}$ is a scalar value indicating the magnitude of the component of the residual vector $\vec{y}_{224A}$ in a direction perpendicular to the side edge of the bounding shape 210—e.g., the magnitude of the residual vector in the direction corresponding to unit vector $\hat{b}_2$. Where $\hat{b}_2$ indicates a unit vector corresponding to a local direction indicated by the tracking point reference frame.

Continuing the example, the magnitude of the residual vector $\vec{y}_{224B}$ defined with respect to equation 8 may be determined. Because the front edge of the bounding shape 210 lines up with the direction of the unit vector $\hat{b}_2$, performing a dot product multiplying the residual $\vec{y}_{224}$ with the unit vector $\hat{b}_1$ may result in the magnitude of the residual 224B in a direction perpendicular to the front edge of the bounding shape 210. In some embodiments, the equation corresponding to the residual 224B may be defined as:

$$Y_{224B} = \vec{y}_{224B} \cdot \hat{b}_1 \quad (11)$$

Where $Y_{224B}$ is a scalar value indicating the magnitude of the component of the residual vector $\vec{y}_{224B}$ in a direction perpendicular to the front edge of the bounding shape 210—e.g., the magnitude of the residual vector in the direction corresponding to unit vector $\hat{b}_1$. Where $\hat{b}_1$ indicates a unit vector corresponding to a local direction indicated by the tracking point reference frame.

In some embodiments, the residual corresponding to the tracking point 208 (e.g., residual 224C defined with respect to equation 9) may include a vector including a value corresponding to the difference between the expected location and measured location in the direction corresponding to the unit vector $\hat{a}_1$ and the difference between the expected location and measured location in the direction corresponding to the unit vector $\hat{a}_2$. The vector may be defined as:

$$Y_{224c} = \begin{pmatrix} \vec{y}_{224C} \cdot \hat{a}_1 \\ \vec{y}_{224C} \cdot \hat{a}_2 \end{pmatrix} \quad (12)$$

Where $Y_{224c}$ is a vector indicating the magnitude of the component of the residual vector $\vec{y}_{224C}$ in a direction corresponding to the tracking point 208 where $\vec{y}_{224C} \cdot \hat{a}_1$ may yield the magnitude of the residual in the local direction corresponding to the unit vector $\hat{a}_1$ indicating a local direction corresponding to the sensor reference frame and where $\vec{y}_{224C} \cdot \hat{a}_2$ may yield the magnitude of the residual in the local direction corresponding to the unit vector $\hat{a}_2$ indicating a local direction corresponding to the sensor reference frame.

In some embodiments, the one or more residuals 224 determined with respect to equations 10-12 may be used to estimate one or more states corresponding to the object 220—e.g., using one or more Kalman filtering techniques. In some embodiments, the one or more Kalman filtering techniques may use the residuals 224 determined based on one or more sides corresponding to the bounding shape 210 to determine one or more estimated states corresponding to the object 220. Further, the residuals 224 may be used in one or more Kalman update operations to determine one or more estimated states corresponding to the object 220.

In some embodiments, the one or more Kalman update operations may include determining the Kalman gain. In some embodiments, the Kalman gain may be determined based, at least in part, on a state-to-measurement residual matrix "H" and a measurement noise covariance "$R_e$" corresponding to the one or more residuals 224 and one or more sides of the bounding shape 210 (e.g., the side edge and/or the front edge of the bounding shape 210) as described in further detail herein such as, for example, with respect to equations 13 and 28.

In some embodiments, the state-to-measurement residual matrix H may transform a vector corresponding to the estimated state of the object 220 into the same space as the space corresponding to one or more residuals corresponding to one more measurements (e.g., position, velocity, acceleration measured using sensor data). In some embodiments, the state-to-measurement residual matrix H may transform a predicted state vector corresponding to the object 220 from the tracking point reference frame to the sensor reference frame. The state-to-measurement residual matrix H may be used to determine the Kalman gain associated with the state of the object 220 and may thereby be used to determine one or more expected states corresponding to the object 220.

In some embodiments, the state-to-measurement residual matrix H may be defined as a partial derivative of the residual "Y" with respect to the state of the object 220 "X." That is, the partial derivative of the residual "Y" with respect to positions (e.g., x and y) corresponding to the state of the object, the partial derivative of the residual "Y" with respect to velocities (e.g., $v_x$, $v_y$), and the partial derivative of the residual "Y" with respect to accelerations (e.g., $a_x$, $a_y$) corresponding to the object 220 shown generally in the equation below:

$$H = -\frac{\partial Y}{\partial X} = -\begin{bmatrix} \frac{\partial Y}{\partial x} & \frac{\partial Y}{\partial y} & \frac{\partial Y}{\partial v_x} & \frac{\partial Y}{\partial v_y} & \frac{\partial Y}{\partial a_x} & \frac{\partial Y}{\partial a_y} \end{bmatrix} \quad (13)$$

Where Y represents the residual that may correspond to any of the residuals 224—e.g., $Y_{224A}$, $Y_{224B}$, and/or $Y_{224C}$, and the matrix H indicates the gradient corresponding to the partial derivatives of the residual Y with respect to the state X, that is, the position, the velocity, and the acceleration.

In some embodiments, the state-to-measurement residual matrix H may be determined based on the one or more locations of the one or more expected measurements corresponding to the bounding shape 210. In some embodiments, the state-to-measurement residual matrix H may be used to calculate a Kalman gain with respect to measurements corresponding to the side edge and/or the front edge of the bounding shape 210. In some embodiments, because the residual vectors corresponding to the side edge and/or the front edge of the bounding shape 210 (e.g., residual vectors determined with respect to equations 7 and 8) represent a vector in a direction perpendicular to the side edge and/or front edge respectively, one or more unit vectors $\hat{b}_1$ and/or $\hat{b}_2$ may be used to transform the Kalman gain from the sensor reference frame to the tracking point reference frame, as described with respect to equations 14-25.

In some embodiments, the state-to-measurement residual matrix H may be determined with respect to the side edge of the bounding shape 210. Because the residual 224A may be determined with respect to the side edge of the bounding shape 210, the partial derivatives corresponding to the residual 224A may be used for illustrative purposes. In these and other embodiments, the state-to measurement matrix H corresponding to the side edge of the bounding shape 210 may be the same for other residuals corresponding to the side edge of the bounding shape 210. The state-to-measurement residual matrix H corresponding to the side edge of the bounding shape 210 may be determined using equations 14-19 defined below:

$$\frac{\partial Y_{224A}}{\partial x} = \frac{\partial (\vec{y}_{224A} \cdot \hat{b}_1)}{\partial x} = -\hat{a}_1 \cdot \hat{b}_1 \quad (14)$$

$$\frac{\partial Y_{224A}}{\partial y} = \frac{\partial (\vec{y}_{224A} \cdot \hat{b}_1)}{\partial y} = -\hat{a}_2 \cdot \hat{b}_1 \quad (15)$$

$$\frac{\partial Y_{224A}}{\partial v_x} = \frac{\partial (\vec{y}_{224A} \cdot \hat{b}_1)}{\partial v_x} = \vec{y}_{224A} \cdot \frac{-v_y}{\vec{v} \cdot \vec{v}} \hat{b}_2 \quad (16)$$

$$\frac{\partial Y_{224A}}{\partial v_y} = \frac{\partial (\vec{y}_{224A} \cdot \hat{b}_1)}{\partial v_y} = \vec{y}_{224A} \cdot \frac{v_x}{\vec{v} \cdot \vec{v}} \hat{b}_2 \quad (17)$$

$$\frac{\partial Y_{224A}}{\partial a_x} = \frac{\partial (\vec{y}_{224A} \cdot \hat{b}_1)}{\partial a_x} = 0 \quad (18)$$

$$\frac{\partial Y_{224A}}{\partial a_y} = \frac{\partial (\vec{y}_{224A} \cdot \hat{b}_1)}{\partial a_y} = 0 \quad (19)$$

Where $\hat{a}_1$ represents the unit vector in the local x-direction corresponding to the sensor reference frame and $\hat{a}_2$ represents the unit vector in the local y-direction corresponding to the sensor reference frame.

$$\frac{\partial Y_{224A}}{\partial x}$$

indicates the partial derivative of the residual $Y_{224A}$ with respect to the position of the residual in the x-direction, $$\frac{\partial Y_{224A}}{\partial y}$$

indicates the partial derivative of the residual $Y_{224B}$ with respect to the position of the residual in the y-direction.

$$\frac{\partial Y_{224A}}{\partial v_x}$$

indicates the partial derivative of the residual $Y_{224A}$ with respect to the velocity in the x-direction, and $$\frac{\partial Y_{224A}}{\partial v_y}$$

indicates the partial derivative of the residual $Y_{224A}$ with respect to the velocity in the y-direction. Further, $$\frac{\partial Y_{224A}}{\partial a_x}$$

indicates the partial derivative or the residual $Y_{224A}$ with respect to the acceleration in the x-direction, and $$\frac{\partial Y_{224A}}{\partial a_y}$$

indicates the partial derivative of the residual $Y_{224A}$ with respect to the acceleration in the y-direction.

In some embodiments, a state-to-measurement residual matrix H may be determined with respect to the front edge of the bounding shape 210. Because the residual 224B may be determined with respect to the front edge of the bounding shape 210, the partial derivatives corresponding to the residual 224B may be used for illustrative purposes. In these and other embodiments, the state-to measurement matrix H corresponding to the front edge of the bounding shape 210 may be the same for other residuals corresponding to the front edge of the bounding shape 210. The state-to-measurement residual matrix H corresponding to the front edge of the bounding shape 210 may be determined using equations 20-25 defined below:

$$\frac{\partial Y_{224B}}{\partial x} = \frac{\partial (\vec{y}_{224B} \cdot \hat{b}_2)}{\partial x} = -\hat{a}_1 \cdot \hat{b}_2 \quad (20)$$

$$\frac{\partial Y_{224B}}{\partial y} = \frac{\partial (\vec{y}_{224B} \cdot \hat{b}_2)}{\partial y} = -\hat{a}_2 \cdot \hat{b}_2 \quad (21)$$

$$\frac{\partial Y_{224B}}{\partial v_x} = \frac{\partial (\vec{y}_{224B} \cdot \hat{b}_2)}{\partial v_x} = \vec{y}_{224B} \cdot \frac{v_y}{\vec{v} \cdot \vec{v}} \hat{b}_1 \quad (22)$$

$$\frac{\partial Y_{224B}}{\partial v_y} = \frac{\partial (\vec{y}_{224B} \cdot \hat{b}_2)}{\partial v_y} = \vec{y}_{224B} \cdot \frac{-v_x}{\vec{v} \cdot \vec{v}} \hat{b}_1 \quad (23)$$

$$\frac{\partial Y_{224B}}{\partial a_x} = \frac{\partial (\vec{y}_{224B} \cdot \hat{b}_1)}{\partial a_x} = 0 \quad (24)$$

$$\frac{\partial Y_{224B}}{\partial a_y} = \frac{\partial (\vec{y}_{224B} \cdot \hat{b}_1)}{\partial a_y} = 0 \quad (25)$$

Where $\hat{a}_1$ represents the unit vector in the local x-direction corresponding to the sensor reference frame and $\hat{a}_2$ represents the unit vector in the local y-direction corresponding to the sensor reference frame. $\hat{b}_2$ indicates a unit vector corresponding to a local direction indicated by the tracking point reference frame, and $\hat{b}_1$ indicates a unit vector corresponding to a local direction indicated by the tracking point reference frame. Where $$\frac{\partial Y_{224B}}{\partial x}$$

indicates the partial derivative of the residual $Y_{224B}$ with respect to the position of the residual in the x-direction, $$\frac{\partial Y_{224B}}{\partial y}$$

indicates the partial derivative of the residual $Y_{224B}$ with respect to the position of the residual in the y-direction.

$$\frac{\partial Y_{224B}}{\partial v_x}$$

indicates the partial derivative or the residual $Y_{224B}$ with respect to the velocity in the x-direction, and $$\frac{\partial Y_{224B}}{\partial v_y}$$

indicates the partial derivative or the residual $Y_{224B}$ with respect to the velocity in the y-direction. Further, $$\frac{\partial Y_{224B}}{\partial a_x}$$

indicates the partial derivative of the residual $Y_{224B}$ with respect to the acceleration in the x-direction, and $$\frac{\partial Y_{224B}}{\partial a_y}$$

indicates the partial derivative of the residual $Y_{224B}$ with respect to the acceleration in the y-direction.

In some embodiments, a state-to-measurement residual matrix H may be determined with respect to the tracking point 208 corresponding to the bounding shape 210. Because the residual 224C may be determined with respect to the tracking point 208 of the bounding shape 210, the partial derivatives corresponding to the residual 224C may be used for illustration. In these and other embodiments, the state-to measurement matrix H corresponding to the tracking point 208 may be determined with respect to equation 13. In some embodiments, because the residual 224C may include vector components corresponding to both directions corresponding to the unit vectors associated with the tracking point reference frame, the corresponding matrix may be defined as matrix 26 below:

$$H = \begin{bmatrix} 1 & 0 & 0 & 0 & 0 & 0 \\ 0 & 1 & 0 & 0 & 0 & 0 \end{bmatrix} \quad (26)$$

In addition to the state-to-measurement residual matrix H, the amount of noise associated with the one or more measured states (e.g., position, velocity, acceleration, jerk, etc. corresponding to the detection points) may be determined. In some embodiments, the measurement noise representation "R" may refer to an amount of uncertainty associated with sensor data indicating one or more measurement characteristics corresponding to the one or more detection points 222 (e.g., position, velocity, acceleration, etc.). In some embodiments, a first measurement noise covariance matrix $R_1$ may be determined based on sensor data corresponding to the detection point 222A. Further, a second measurement noise covariance matrix $R_2$ may be determined based on sensor data corresponding to the detection point 222B, and a third measurement noise covariance matrix $R_3$ that may be determined based on sensor data corresponding to the detection point 222C.

In some embodiments, the measurement noise covariance matrix $R_e$ may be determined based on one or more residuals 224 corresponding to the bounding shape 210. In some embodiments, the measurement noise covariance matrix $R_e$ may be a product of one or more transformation matrices based on one or more edges corresponding to the bounding shape 210 (e.g., the front edge and/or the side edge) defined, for example, using equation 27 below. The noise covariance matrix $R_e$ may additionally be a product of the measurement noise representation R indicating uncertainty corresponding to sensor data corresponding to the one or more detection points 222 defined with respect to equation 28 below. The equations described may be defined as follows, where $\hat{b}_e$ may correspond to one or more unit vectors depending on the edge of the bounding shape 210 corresponding to the one or more residuals 224:

$$B_e = [\hat{b}_e \cdot \hat{b}_1 \ \hat{b}_e \cdot \hat{b}_2]^T \quad (27)$$

$$R_e = B_e^T T R T^T B_e \quad (28)$$

Where $B_e$ is a matrix used to project the measurement noise covariance matrix in a direction corresponding to either $\hat{b}_1$ or $\hat{b}_2$ respectively. $\hat{b}_1$ indicates a unit vector corresponding to a local direction indicated by the tracking point reference frame. $\hat{b}_e$ indicates a unit vector corresponding to either $\hat{b}_1$ or $\hat{b}_2$ based on the edge to which one or more measurement positions may correspond—e.g., the front edge or the side edge of the bounding shape 210. depending on the edge of the bounding shape 210 corresponding to the one or more residuals 224. $R_e$ is the measurement noise covariance matrix corresponding to one or more measurement positions that may be determined depending on the one or more sides of the bounding shape 210 corresponding to the measuring position. R indicates an amount of uncertainty associated with sensor data indicating one or more measurement characteristics corresponding to the one or more detection points 222. And where T indicates the transformation matrix used to transform the measurement noise covariance matrix from the sensor reference frame to the tracking point reference frame as defined with respect to equation 4.

In some embodiments, one or more Kalman updates may be performed using one or more measured positions (e.g., positions corresponding to one or more detection points 222), one or more expected positions (e.g., positions corresponding to one or more locations on the bounding shape 210), one or more corresponding residuals, and one or more corresponding Kalman gain measurements.

By way of example and not limitation, a first Kalman update may be performed with respect to a first position measurement corresponding to the detection point 222A. With respect to the first Kalman update, a first expected position corresponding to the first Kalman update may be an expected position determined based on the bounding shape 210. In some instances, the expected position may be a point along the side edge of the bounding shape 210 that may be nearest the detection point 222A. Additionally or alternatively, the residual 224A corresponding to the first Kalman update may be determined as the difference between the first expected position and the first position measurement. Further, the first Kalman update may factor in the Kalman gain that may be determined based at least on the residuals, covariances, and/or state-to-measurement residual matrices associated with detection point 222A, residual 224A, and/or the bounding shape 210.

Continuing the example, a second Kalman update may be performed with respect to a second position measurement corresponding to the detection point 222B that may be deemed as corresponding to the front edge of the bounding shape 210. With respect to the second Kalman update, a second expected position may be determined based on the bounding shape 210. In some instances, the expected position may be a point along the front edge of the bounding shape 210 that may be nearest the second position measurement. Additionally or alternatively, the residual 224B may be determined as the difference between the second expected position and the second position measurement. Further, the second Kalman update may factor in the Kalman gain that may be determined based at least on the residuals, covariances, and/or state-to-measurement matrices associated with detection point 222B, residual 224B, and/or the bounding shape 210. One or more additional Kalman update operations may be performed with respect to one or more measured positions and expected positions corresponding to the object 220. For example, a similar Kalman update operation may be performed with respect to detection point 222C, residual 224C, and the bounding shape 210.

In one or more embodiments disclosed herein, rather than employing a traditional Kalman filtering technique in which expected position measurements and corresponding residuals are performed with respect to many noisy measurements and/or based on a clustered point (e.g., a centroid), the present disclosure incorporates using the bounding shape 210 as a reference for making such determinations. Such a technique may improve the tracking of objects that have multiple portions having respective measurements corresponding thereto by using position measurements that are more likely to be more accurate and less noisy. Further, the adjustment of the expected positions and residuals in this manner may be much simpler than clustering techniques, which may help reduce computational costs and/or reduce errors that may be hard to identify due to complexities in the clustering techniques.

Modifications, additions, or omissions may be made to FIG. 2A and/or FIG. 2B without departing from the scope of the present disclosure. For example, the number of bounding shape sides 212, object 220, locations of the sensor 202 and/or the tracking point 208, the size of the filtered area 206 may vary. Further, the number and/or locations of detection points 222 may vary. The specifics given and discussed are to help provide explanation and understanding of concepts of the present disclosure and are not meant to be limiting.

Figure 3:
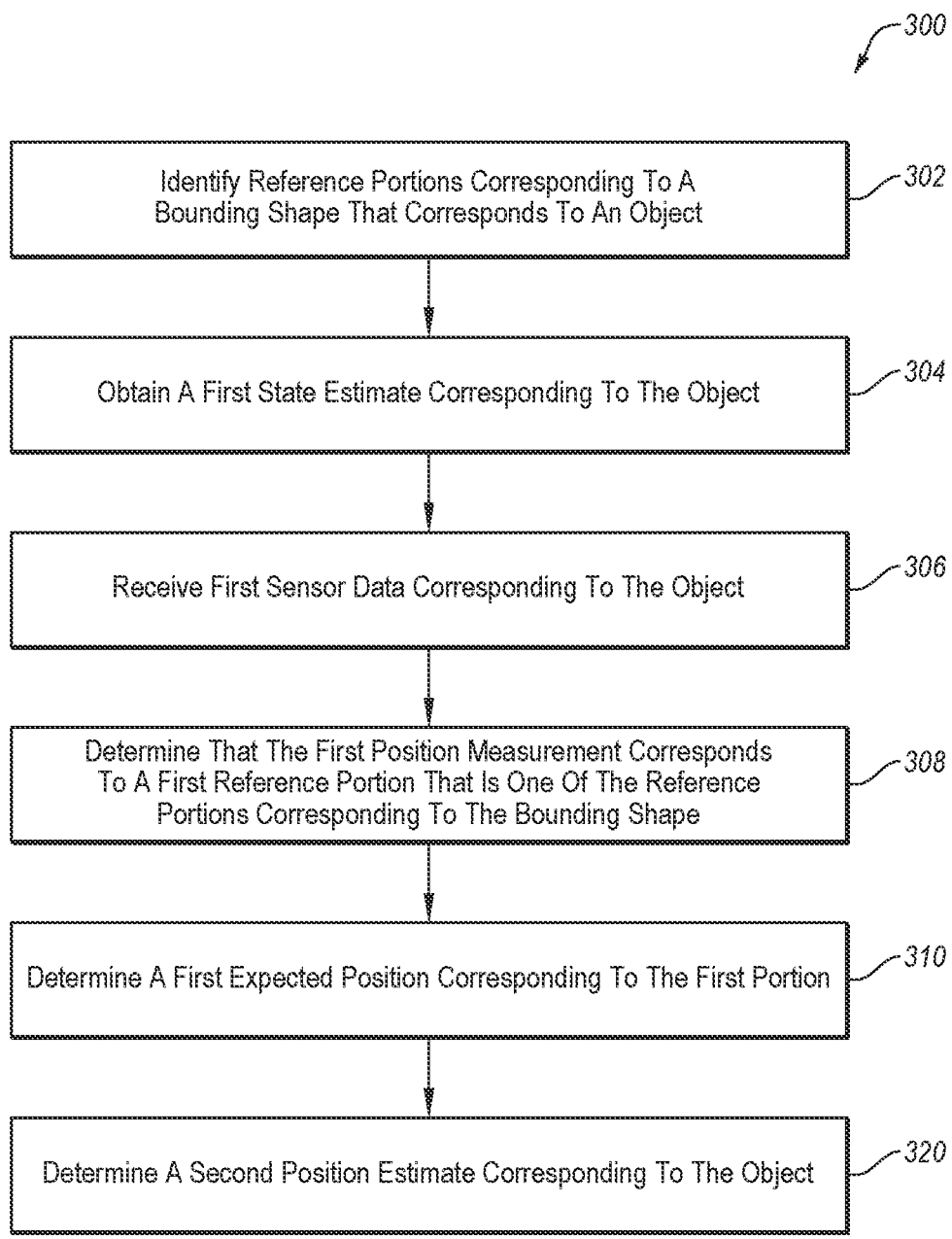
FIG. 3 is a flow diagram showing a method for determining one or more position estimates corresponding to a bounding shape associated with an object, in accordance with one or more embodiments of the present disclosure.

FIG. 3 is a flow diagram showing a method 300 for determining one or more position estimates corresponding to a bounding shape associated with an object, in accordance with one or more embodiments of the present disclosure. One or more operations of the method 300 may be performed by any suitable system, apparatus, or device such as, for example the sensor 102 and/or the vehicle 110 of FIG. 1, the sensor 202 of FIG. 2, the autonomous vehicle system(s) described with respect to FIGS. 6A-6D, computing device(s) described with respect to FIG. 7, and/or the data system(s) described with respect to FIG. 8 in the present disclosure.

The method 300 may include one or more blocks 302, 304, 306, 308, 310, and 312. Although illustrated with discrete blocks, the operations associated with one or more of the blocks of the method 300 may be divided into additional blocks, combined into fewer blocks, or eliminated, depending on the particular implementation.

In some embodiments, the method 300 may include block 302. At block 302, one or more reference portions that correspond to a bounding shape that corresponds to an object may be identified. In some embodiments, the bounding shape may be based at least on multiple sensor measurements that may correspond to the object. In some embodiments, the sensor data corresponding to one or more detection points may be an example of or include the multiple sensor measurements (e.g., detection point(s) 204 and/or detection point(s) 222 described and illustrated, such as, for example, with respect to FIGS. 2A, and 2B). In some embodiments, the one or more reference portions corresponding to the bounding shape may include a first reference edge, a second reference edge, and/or a reference vertex at which the first reference edge and the second reference edge may intersect. For example, the front edge and the side edge of the bounding shape 210 described and illustrated such as, for example, with respect to FIGS. 2A and 2B may be examples of the first reference edge and the second reference edge. Further, the tracking point 208 may be an example of the reference vertex at which the first reference edge and the second reference edge. In some embodiments, the reference vertex may correspond to the portion of the object that may be located nearest a sensor (e.g., sensor 102 and/or sensor 202 described with respect to FIGS. 1, 2A, and 2B) generating one or more sensor measurements. Additionally or alternatively the reference vertex may correspond to the portion of the object that may be within a best line of sight for the sensor (e.g., a RADAR sensor) that may be generating the one or more sensor measurements. In these and other embodiments, identifying reference positions corresponding to the bounding shape may be described and illustrated further in the present disclosure, such as, for example, with respect to the front edge, the side edge, and the tracking point 208 corresponding to the bounding shape 210 in FIGS. 2A and 2B.

At block 304, A first state estimate corresponding to the object may be obtained. In some embodiments, the first state estimate may include a first position estimate and a first velocity estimate. In some embodiments, the first state estimate may be a previous state estimate that was estimated using one or more Kalman filtering techniques that may determine the first state estimate based, at least in part, on sensor data corresponding to one or more detection points described further in the present disclosure, such as, for example, with respect to FIGS. 1, 2A, and 2B.

At block 306, first sensor data corresponding to the object may be received. In some embodiments, the first sensor data may include a first position measurement; for example, the first position measurement and first sensor data may correspond to one or more detection points (e.g., detection points 104, 204 and/or detection points 222) that may be described and illustrated further in the present disclosure, such as, for example, with respect to FIGS. 2A and 2B.

At block 308, it may be determined that the first position measurement may correspond to a first reference portion. In some embodiments, the first reference portion may correspond to the bounding shape. For example, the first reference portion may be determined as corresponding to the front edge, the side edge, or the tracking point 208 associated with the bounding shape 210 such as described, for example, with respect to FIGS. 2A and 2B. In some embodiments, determining that the first position measurement may correspond to the first portion may be based at least on the first position measurement that may correspond to the first sensor data that may be within a predetermined threshold distance of the first reference portion. In these and other embodiments, the determination that the first position may correspond to the first reference portion may be described and illustrated with respect to the bounding shape further in the present disclosure, such as, for example, with respect to FIGS. 2A and 2B.

At block 310, a first expected position corresponding to the first reference portion may be determined. For example, an expected position corresponding to one or more sensor measurements as described in the present disclosure, such as, for example, with respect to FIGS. 1, 2A and 2B. In some embodiments, prior to determining that the first expected position may correspond to the first reference portion, at least a portion of the sensor data may be filtered out. In some embodiments, the portion of the sensor data filtered out may be determined based at least on the portion of the first sensor data being located outside of a predetermined threshold distance from the first reference portion. In these and other embodiments, determining a first expected position and/or filtering out sensor data corresponding to one or more measured positions may be described and illustrated further in the present disclosure, such as, for example, with respect to FIGS. 2A and 2B.

At block 312 a second position estimate corresponding to the object may be determined. In some embodiments, the second position estimate may be based at least on the first expected position and the first state estimate. In these and other embodiments, estimating the second position estimate may be described and illustrated further in the present disclosure, such as, using one or more Kalman filtering techniques described, for example, with respect to FIG. 2B.

Modifications, additions, or omissions may be made to the method 300 and/or one or more operations included in the method 300 without departing from the scope of the present disclosure. For example, the operations corresponding to the method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 4:
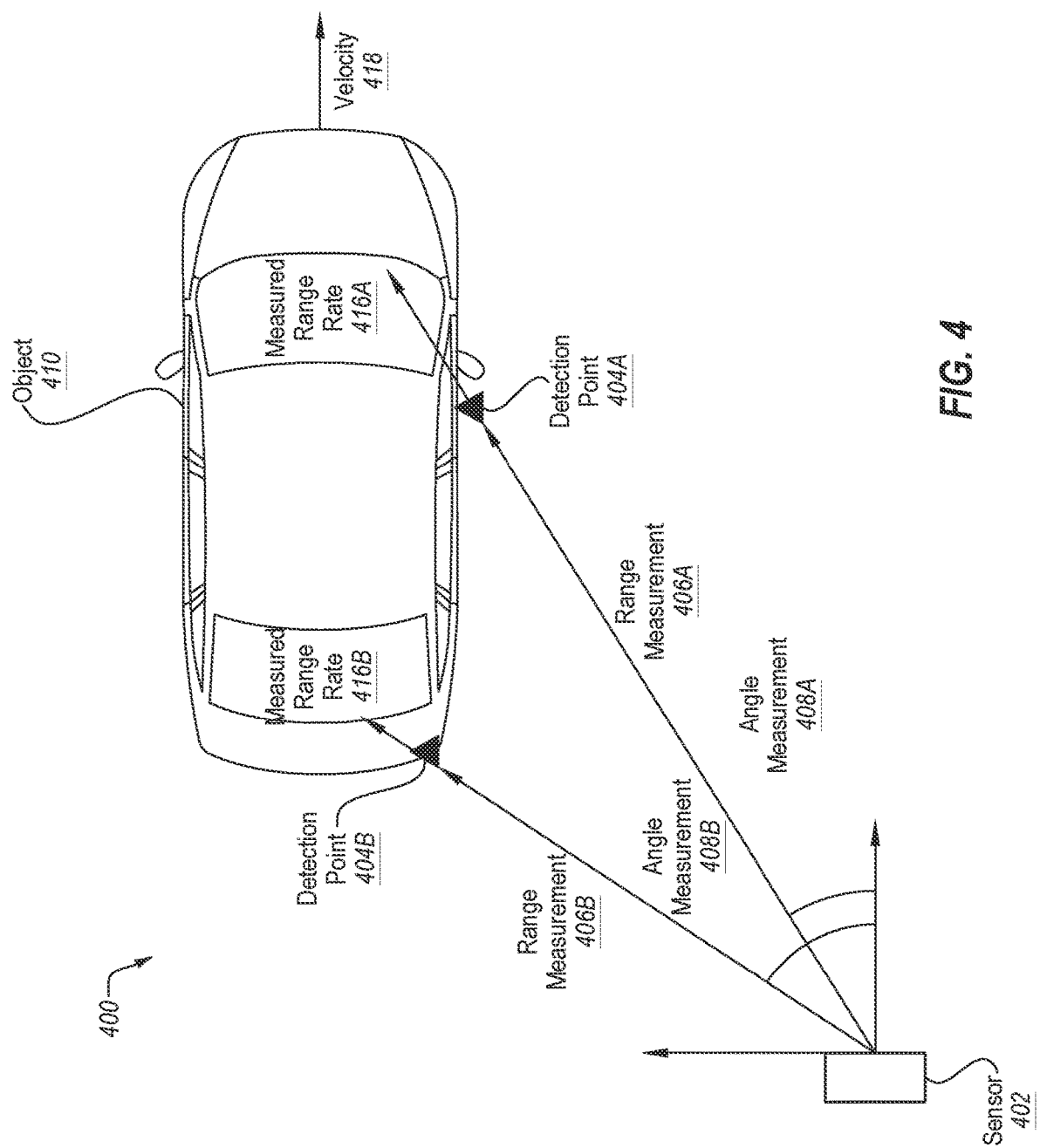
FIG. 4 is a diagram representing an example environment related to determining an expected range rate or velocity corresponding to an object, in accordance with one or more embodiments of the present disclosure.

FIG. 4 is a diagram representing an example environment 400 related to determining an expected velocity corresponding to an object 410, in accordance with one or more embodiments of the present disclosure. In some embodiments, the environment 400 may include a sensor 402, the object 410, and one or more detection points 416 corresponding to one or more portions of the object 410. In some embodiments, the operations described with respect to FIG. 4 may be performed using any suitable system, apparatus, or device. For example, the operations may be performed by one or more modules that may be implemented using one or more processors, central processing units (CPUs) graphics processing units (GPUs), data processing units (DPUs), parallel processing units (PPUs), microprocessors (e.g., to perform or control performance of one or more operations), PVAs, field-programmable gate arrays (FPGA), application-specific integrated circuits (ASICs), accelerators (e.g., deep learning accelerators (DLAs)), and/or other processor types. In some other instances, one or more modules may be implemented using a combination of hardware and software. In these or other embodiments, one or more modules performing operations in the present disclosure may be implemented by one or more computing devices, such as that described in further detail with respect to FIGS. 6A-6D, 7, and/or 8.

In some embodiments, the object 410 may be present in the environment 400 with one or more movement characteristics (e.g., an actual position, an actual velocity, an actual acceleration, etc.) In some embodiments, the actual velocity may be indicated in the present disclosure with the velocity 418. The object 410 may be the same as and/or analogous to the vehicle 112 and/or the object 220 described and/or illustrated further in the present disclosure, such as, for example, with respect to FIGS. 1, 2A, and 2B.

In some embodiments, the sensor 402 may be the same as and/or analogous to the sensor 102 and/or the sensor 202 described and/or illustrated further in the present disclosure, such as, for example, with respect to FIGS. 1, 2A, and/or 2B.

In some embodiments, a state of the object 410 may be determined based on sensor data generated using the sensor 402. In some embodiments, the state of the object 410 may include one or more movement characteristics (e.g., a state position, a state velocity, a state acceleration, etc.) that may be determined as discussed further in the present disclosure with respect to FIG. 4. In some embodiments, the state of the object 410 may include one or more estimated values corresponding to the object 410. For example, the state velocity may be an estimation and/or an approximation of the velocity 418 corresponding to the object 410.

In some embodiments, the state position, the state velocity, and the state acceleration, etc. may be determined based on a Cartesian coordinate system corresponding to a location of the object 410 with respect to the sensor 402. In some embodiments, the state of the object 410 may be determined at one or more time stamps (e.g., $t_1$, $t_2$, $t_3$, etc.).

By way of example and not limitation, the state of the object 410 may be indicated using the expression defined below:

$$X_t = [x, y, v_x, v_y] \qquad (29)$$

where X is a matrix including values representing a state corresponding to the object 410 at a particular time t. Where x and y indicate a position corresponding to the object 410, where $v_x$ and $v_y$ are components of the state velocity corresponding to the object 410 in the x-direction and the y-direction respectively.

In some embodiments, the detection points 404 may be the same and/or analogous to the detection points 104, detection points 204, and/or detection points 222 described further in the present disclosure, such as, for example, with respect to FIGS. 1, 2A, and 2B.

In some embodiments, detection point 404A may correspond to a first portion of the object 410 and may have sensor data associated therewith. Additionally or alternatively, detection point 404B may correspond to a second portion of the object 410 and may have sensor data associated therewith. While two detection points 404 are illustrated in the present figure, the object 410 may be represented using any number of detection points 404 corresponding to sensor data that may be generated using the sensor 402.

In some embodiments, detection point 404A may correspond to sensor data that may indicate a range measurement 406A, an angle measurement 408A, and/or a measured range rate 416A corresponding to the first portion of the object 410. In some embodiments, detection point 404B may include sensor data indicating a range measurement 406B, an angle measurement 408B, and/or a measured range rate 416B corresponding to the second portion of the object 410.

In some embodiments, the range measurements 406 corresponding to portions of the object 410 indicated using sensor data corresponding to one or more detection points 404 may be examples of the range measurement 106 described and/or illustrated further in the present disclosure, such as, for example, with respect to FIG. 1.

In some embodiments, the angle measurements 408 corresponding to portions of the object 410 indicated using sensor data corresponding to one or more detection points 404 may be examples of the angle measurement 108 described and/or illustrated further in the present disclosure, such as, for example, with respect to FIG. 1.

Further, in some embodiments, the measured range rates 416 corresponding to portions of the object 410 indicated using sensor data corresponding to one or more detection points 404 may be examples of the range rate 116 described and/or illustrated further in the present disclosure, such as, for example, with respect to FIG. 1.

By way of example and not limitation, the range measurements 406, angle measurements 408, and range rates 416 corresponding to respective portions of the object 410 may be represented by a matrix "Z" defined below:

$$Z_i = [x_i, y_i, \dot{r}_i] \qquad (30)$$

where x and y correspond to the range measurement 406 indicating a position corresponding to a portion of the object 410 using cartesian coordinates relative to the position of the sensor 402. Where $\dot{r}$ corresponds to the measured range rate 416 corresponding to respective portions of the object 410 and where i indicates an individual detection point 404 (e.g., detection point 404A or detection point 404B) corresponding to an individual portion of the object 410.

In some embodiments, the matrix 30 defined above may be defined and/or shown in polar coordinates corresponding to range measurements 406, angle measurements 408, and measured range rates 416 as indicated using the expression below:

$$Z_i = [r_i, \phi_i, \dot{r}_i] \qquad (31)$$

where r corresponds to the range measurement 406, ⌀ corresponds to the angle measurement 408 defined using equation 3 in the present disclosure, where $\dot{r}$ corresponds to the measured range rate 416 of the respective portion of the object 410 corresponding to the respective detection point 404, and where i indicates an individual detection point 404.

In some embodiments, the one or more measured range rates 416 may indicate respective velocities at which the corresponding detection points 404 may be moving away from or toward the sensors 402. In some embodiments, the one or more range rates 416 may include respective velocity vectors that indicate a speed and direction. In some embodiments, the velocity vectors may be referenced with respect to the sensor 402 such that the directions may be along the same line as the same direction as the corresponding range measurements. Further, the one or more range rates 416 may also be components of the actual velocities at the respective detection points 404 as a function of the corresponding angle measurements 408.

For example, the detection point 404A associated with a first portion of the object 410 may correspond to a measured range rate 416A that may indicate that the first portion of the object 410 may be travelling at a first velocity away from the sensor 402 at a first direction that may be indicated using the angle measurement 408A. Further, the detection point 404B associated with a second portion of the object 410 may correspond to a measured range rate 416B that may indicate that the second portion of the object 410 may be travelling at a second velocity away from the sensor 402 at a second direction that may be indicated using the angle measurement 408B.

In some embodiments, an aggregation of one or more Kalman filter iterations that may be performed with respect to the one or more measured range rates 416 corresponding to the detection points 404 corresponding to the object 410 may be used to determine the state velocity corresponding to the object 410. For example, the x-component and the y-component of the measured range rate 416A may indicate a first portion of the x-component and y-component of the state velocity corresponding to the state of the object 410. Further, the x-component and the y-component of the measured range rate 416B may indicate a second portion of the x-component and y-component of the state velocity corresponding to the state of the object 410. Continuing the example, the aggregation of one or more Kalman filtering iterations that may be performed with respect to the one or more velocity components to respective measured range rates 416 corresponding to respective portions of the object 410 may indicate the state velocity corresponding to the object 410 as a whole.

In some embodiments, a modified Kalman filtering technique "modified Kalman technique" may be used to update the state velocity corresponding to the object 410. For example, as detailed further in the present disclosure, in the modified Kalman technique, determining respective expected range rates associated with respective portions of the object 410 indicated using one or more respective detection points 404 may be based not only on current state information but also may be based on the angle measurements 408 of the measured sensor data corresponding to the respective detection points 404. As also described in further detail in the present disclosure, the expected range rates determined in this manner may then be compared against the corresponding measured range rates 416 as part of updating the state velocity.

By contrast, as described in the present disclosure, traditional Kalman filtering techniques ("traditional Kalman techniques") may be such that an expected velocity may be determined based on a current state of an object but not based on any sensor measurement data. However, due to relatively large differences between measured range rates for various portions as compared to what may be occurring at a particular tracking point (e.g., the center of mass, geometric center, or other portions of the object) performing Kalman updates according to traditional Kalman techniques may result in state velocities corresponding to the object having large levels of uncertainty. In some prior approaches, the state velocities may be ignored or discarded due to the large levels of uncertainty.

Another technique that has been used to try to account for sensor data corresponding to multiple detection points for a same object is performing pre-processing on the sensor data corresponding to the multiple detection points before performing a Kalman update. In particular, the sensor data corresponding to the multiple detection points may be clustered into a single measurement by determining, for example, a weighted average of all sensor measurements corresponding to all the detection points that are estimated as corresponding to different portions of the object. The clustered sensor measurements may be an estimate of the sensor measurements for a particular tracking point associated with the object—such as the geometric center, depending on the clustering technique used. Such clustered sensor measurements may be used with state estimates—which may also correspond to the center of mass of the object—in performing Kalman updates. However, this technique may be computationally expensive. Additionally or alternatively, this technique may be prone to errors or inaccuracies in determining the clustering (e.g., in determining how to weigh different sensor measurements corresponding to detection points that may be associated with different portions of the object). The limitations of performing pre-processing clustering may be exacerbated by the added complexities that may be introduced by the varying range rate determinations.

Therefore, rather than employing a traditional Kalman filtering technique in which expected measurement determinations are performed only based on previous state estimates, the present disclosure also incorporates using some information from the sensor measurements corresponding to the detection points 404 (e.g., angle measurements 408) as part of some expected measurement determinations (e.g., expected range rates). Such a technique may improve the tracking of objects (e.g., the object 410) that have multiple portions having respective detection points 404 corresponding thereto by better accounting and compensating for differences between measured range rates 416 at various portions corresponding to the object 410. Further, the adjustment of the expected range rate determinations in this manner may be much simpler than clustering techniques, which may help reduce computational costs and/or reduce errors that may be hard to identify due to complexities in the one or more clustering techniques.

By way of example and not limitation, a first portion of the object 410 may have particular sensor data corresponding to detection point 404A that may be associated with a first portion of the object 410. The particular sensor data corresponding to the detection point 404A may include a measured range rate 416A that may indicate a velocity of the first portion of the object 410 with respect to the sensor 402. Further, the particular sensor data may include a first angle measurement 408A "Ø" that may indicate an angle between the sensor 402 and the first portion of the object 410. In addition, an expected velocity corresponding to the object 410 may be determined. In some embodiments, the expected velocity may be determined using the state estimate corresponding to the object 410.

In some embodiments, the expected velocity and the state estimate corresponding to the velocity (the "state velocity") may be the same. Additionally or alternatively, the state velocity and the expected velocity may not be the same. For example, one or more other measurements corresponding to the state estimate corresponding to the object 410 may be used to determine the expected velocity (e.g., a state position, a state acceleration, etc.) according to any suitable technique.

In some embodiments, the expected velocity corresponding to the object 410 may include an expected velocity vector estimate that may correspond to the object 410 (e.g., a center of mass of the object 410). The expected velocity vector estimate may include a first component (e.g., an x component with respect to a Cartesian coordinate system and indicated by "$v_x$") and a second component (e.g., a y component with respect to the Cartesian coordinate system and indicated by "$v_y$").

In some embodiments, the expected range rate corresponding to the first portion of the object 410 may be determined using the expected velocity corresponding to the object 410. According to one or more embodiments of the present disclosure, the determining of a particular expected range rate corresponding to the first portion of the object 410 may include determining, based on the first angle measurement 408A "Ø", components of the expected velocity vector estimate that may correspond to the first portion of the object 410. For example, based on a particular orientation of a reference Cartesian coordinate system that may be used as part of the object tracking, the particular expected range rate "$h_{\dot{r}}$" may be determined according to the following expression:

$$h_{\dot{r}} = v_x \cos \emptyset + v_y \sin \emptyset \qquad (32)$$

The particular expected range rate determined in this manner may better correspond to the actual range rate at the first portion of the object 410 as compared to an expected range rate that may be determined using the current state estimate of the object 410 but not the first angle measurement 408A. This improved correspondence may also result in the particular expected range rate being closer to the measured range rate 416A that corresponds to the first portion of the object 410 that may be indicated using sensor data corresponding to the detection point 404A. Such an improvement may provide for a more accurate expected velocity vector that may be obtained by performing a Kalman update.

By way of example and not limitation, an expected range rate corresponding to the first portion of the object 410 may be determined based on the expected velocity corresponding to the object 410 and the angle measurement 408A corresponding to the first portion of the object 410. In some embodiments, the expected range rate may be determined as a part of an expected state of the object 410 that may be determined using one or more update operations in a modified Kalman technique. For example, the expected range rate corresponding to the object may be determined as a part of an expected state of the object 410 "$X_{exp}$" which may be defined using one or more expressions that may be defined below:

$$X_{exp} = X + K_i Y_{mod} \qquad (33)$$

where $X_{exp}$ may indicate the expected state of the object 410 including an expected range rate corresponding to the object 410. Where X may be the state of the object 410 that may be expressed, for example, using expression 29. Where K may be the Kalman gain corresponding to the detection point i and where Y is the residual corresponding to the difference between the expected range rate and the measured range rate 416 corresponding to a particular detection point 404.

Continuing the example, a first expected velocity may be determined, for example, using the state velocity corresponding to the state of the object 410. Further, an expected range rate may be determined using the expected velocity and the angle measurement 408A corresponding to a first detection point 404A that may correspond to a first portion of the object 410. The expected range rate may be determined using, for example, expression 32.

Continuing the example, the expected range rate of the object 410 and the measured range rate 416A corresponding to the first portion of the object 410 may be compared. In some instances, the comparison between the measured range rate 416A and the expected range rate may be compared using a modified residual calculation defined, for example, below:

$$Y_{mod} = Z_i - h(X, Z_i) \quad (34)$$

In the above expression (34), $Y_{mod}$ is the residual determined between the measurement $Z_i$ defined, for example, with respect to expression 30. In the above expression (34), $h(X, Z_i)$ is a function expressing an expected range rate of the object 410 as a function of both the state X of the object 410 and the measurement $Z_i$ corresponding to a particular portion of the object 410. In some embodiments, $h(X, Z_i)$ may be defined using the expression below:

$$h(X, Z_i) = v_x \cos\phi + v_y \sin\phi \quad (35)$$

In some embodiments, $h(X, Z_i)$ may additionally include one or more other expected terms that may correspond to the state of the object 410. For example, expression (35) may be shown as a matrix including an expected position (e.g., x and y), an expected range rate, an expected acceleration, etc. In some embodiments, the expected range rate may be determined separately from one or more other expected terms corresponding to the state of the object 410 and may therefore be expressed as a scalar as indicated by expression (35).

Continuing the example, the residual $Y_{mod}$ may be determined by comparing the expected range rate and the range rate corresponding to the first portion of the object 410. Further continuing the example, the Kalman gain K may be determined based, at least in part, on a state-to-measurement residual matrix $H_{mod}$ and a range rate noise covariance "$\sigma^2_{expected\ \dot{r}}$" associated with the range rate corresponding to the first portion of the object 410 (e.g., the measured range rate 416A). The state-to-measurement residual matrix $H_{mod}$ may be defined using the expression 36 and the range rate covariance corresponding to the expected range rate may be defined using expression 37 below:

$$H_{mod} = \frac{\partial h(X, Z)}{\partial X} = \begin{bmatrix} 1 & 0 & 0 & 0 \\ 0 & 1 & 0 & 0 \\ 0 & 0 & \cos(\phi) & \sin(\phi) \end{bmatrix} \quad (36)$$

$$\sigma^2_{expected\ \dot{r}} = \sigma^2_{\dot{r}} + (-v_x \sin(\phi) + v_y \cos(\phi))^2 \sigma^2_\phi \quad (37)$$

where $\sigma^2_{expected\ \dot{r}}$ is the noise or variance corresponding to the expected range rate. Where $\sigma^2_{\dot{r}}$ is the variance corresponding to the measured range rate (e.g., the measured range rate 416A) corresponding to a particular detection point 404A, and where $\sigma^2\dot{\phi}$ is the variance corresponding to the angle measurement corresponding to a particular detection point 404 (e.g., angle measurement 408A).

Further continuing the example, the expected range rate corresponding to the object 410 may be updated based on the measurements corresponding to the first portion of the object, namely, the measured range rate 416A and the angle measurement 418A. The modified Kalman update operation may be made using expression 33 using the residual $Y_{mod}$ defined with respect to expression 34 and using the Kalman gain determined using at least the state-to-measurement residual matrix $H_{mod}$ defined with respect to expression 36 and the range rate covariance $\sigma^2_{expected\ \dot{r}}$ defined with respect to expression 37.

In some embodiments, the updated state corresponding to the object 410 may then be used to determine a second expected velocity, a second expected range rate, and a second updated state of the object 410 using sensor data corresponding to detection point 404B corresponding to a second portion of the object 410. In some embodiments, the expected state of the object 410 may be updated iteratively using one or more additional measurements corresponding to one or more respective detection points 404 corresponding to the object 410.

Additionally or alternatively, the range rate covariance corresponding to the expected range rate, $\sigma^2_{expected\ \dot{r}}$, may be a portion of the overall noise covariance corresponding to a particular detection point. In some embodiments, the overall noise covariance may be determined for one or more measurements corresponding to a state of the object 410 (e.g., range measurement, angle measurement, range rate, etc.). In some embodiments, the overall noise covariance corresponding to the object 410 may be used to determine a Kalman gain as part of one or more modified Kalman filter update operations that may be used to determine one or more updated states corresponding to the object 410.

Modifications, additions, or omissions may be made to FIG. 4 without departing from the scope of the present disclosure. For example, the number of detection points 404, the object 410, and locations of the sensor 402 may vary. The specifics given and discussed are to help provide explanation and understanding of concepts of the present disclosure and are not meant to be limiting.

Figure 5:
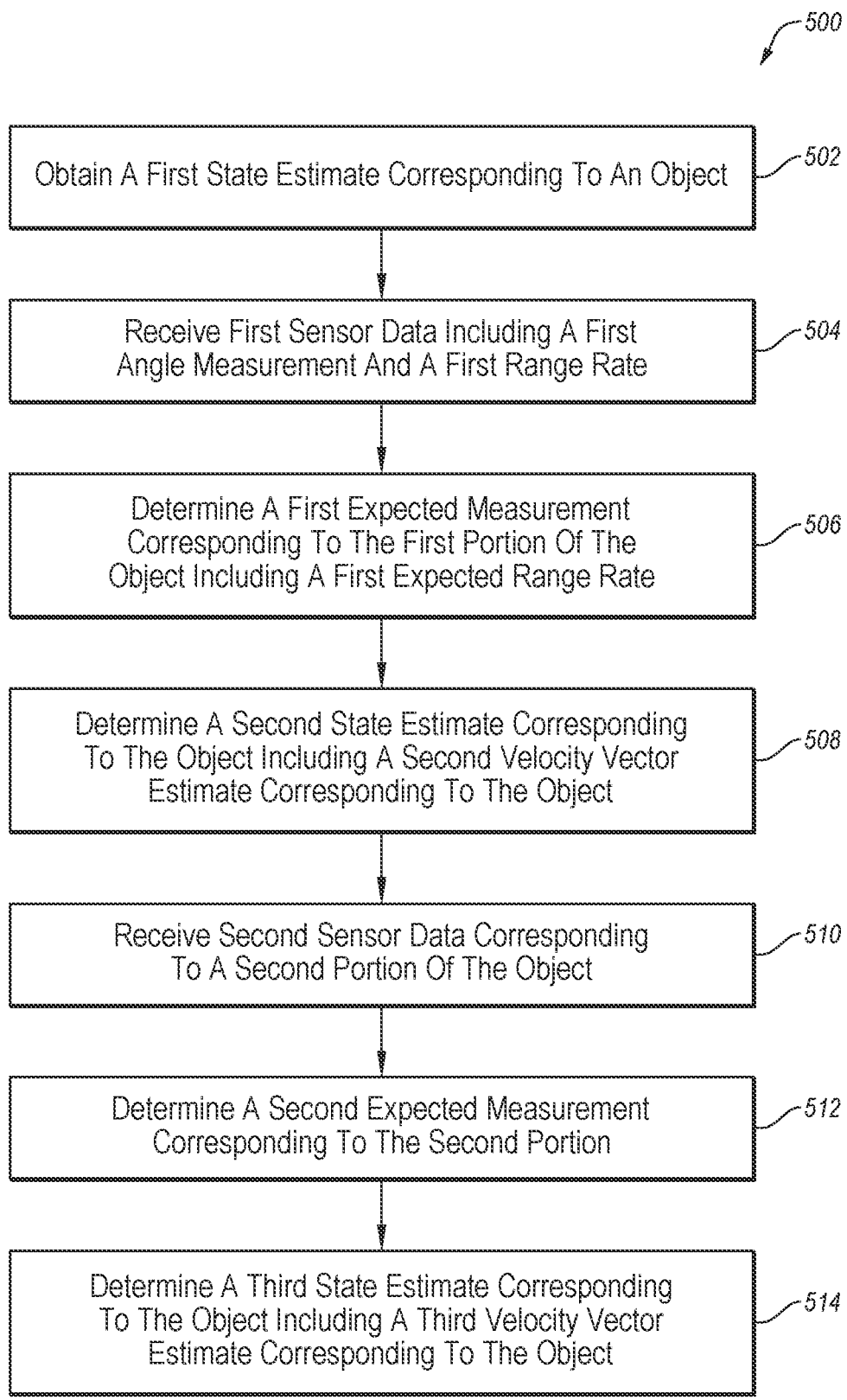
FIG. 5 is a flow diagram showing a method for determining an expected range rate or velocity of an object, in accordance with one or more embodiments of the present disclosure.

FIG. 5 is a flow diagram showing a method 500 for determining an expected range rate of an object, in accordance with one or more embodiments of the present disclosure. One or more operations of the method 500 may be performed by any suitable system, apparatus, or device such as, for example the autonomous vehicle system(s) described with respect to FIGS. 6A-6D, computing device(s) described with respect to FIG. 7, and/or the data system(s) described with respect to FIG. 8 in the present disclosure.

The method 500 may include one or more blocks 502, 504, 506, 508, 510, 512, and 514. Although illustrated with discrete blocks, the operations associated with one or more of the blocks of the method 500 may be divided into additional blocks, combined into fewer blocks, or eliminated, depending on the particular implementation.

The method 500 may include block 502, at block 502, a first state estimate corresponding to an object may be obtained. In some embodiments, the first state estimate may include a first velocity vector estimate corresponding to the object, for example, an estimate of the velocity 418 corresponding to the object 410 described and/or illustrated further in the present disclosure, such as, for example, with respect to FIG. 4.

At block 504, first sensor data may be received corresponding to a first portion of the object. In some embodiments, the first sensor data may include a first angle measurement (e.g., angle measurement 408A described, for example, with respect to FIG. 4) and a first range rate measurement (e.g., the measured range rate 416 described, for example, with respect to FIG. 4).

In some embodiments, the first angle measurement may correspond to a first angle with respect to a sensor and the first portion of the object. In some embodiments, the first range rate measurement may correspond to a first range rate corresponding to the first portion of the object. In some embodiments, the sensor may include a RADAR sensor, such as those described in the present disclosure such as, for example, with respect to FIGS. 1, 2A, 2B, and 4.

At block 506, a first expected measurement corresponding to the first portion of the object may be determined. In some embodiments, the first expected measurement may include a first expected range rate (e.g., the expected velocity described, for example, with respect to FIG. 4). In some embodiments, the first expected range rate may be determined based at least on the first angle measurement and the first velocity vector estimate of the first state estimate.

At block 508, a second state estimate may be determined corresponding to the object. In some embodiments, the second state estimate may include a second velocity vector estimate that may correspond to the object. In some embodiments, the second velocity vector estimate may be determined based at least on the first range rate measurement and the first expected range rate.

Additionally or alternatively, the second velocity vector estimate may be based at least on a comparison between the first range rate measurement and the first expected range rate—e.g., described and/or illustrated, for example, with respect to the expected velocity determination in FIG. 4. Further, the second velocity vector estimate may be further determined based at least on a measurement variance corresponding to the first expected range rate. In some embodiments, the measurement variance may be adjusted based at least on an angle variance corresponding to the first angle measurement.

At block 510, second sensor data corresponding to a second portion of the object may be received. In some embodiments, the second sensor data may include a second angle measurement corresponding to a second angle with respect to the sensor and the second portion. Additionally or alternatively, the second sensor data may include a second range rate measurement that may correspond to a second range rate that may correspond to the second portion of the object. In some embodiments, the first sensor data and the second sensor data may correspond to a same scan performed by the sensor.

At block 512, a second expected measurement corresponding to the second portion of the object may be determined. In some embodiments, the second expected measurement may include a second expected range rate that may be determined based at least on the second angle measurement and the second velocity vector estimate of the second state estimate.

At block 514, a third state estimate corresponding to the object may be determined. In some embodiments, the third state estimate may include a third velocity vector estimate that may correspond to the object. In some embodiments, the third state estimate may be determined based at least on the second range rate measurement and the second expected range rate.

Modifications, additions, or omissions may be made to one or more operations included in the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 6A:
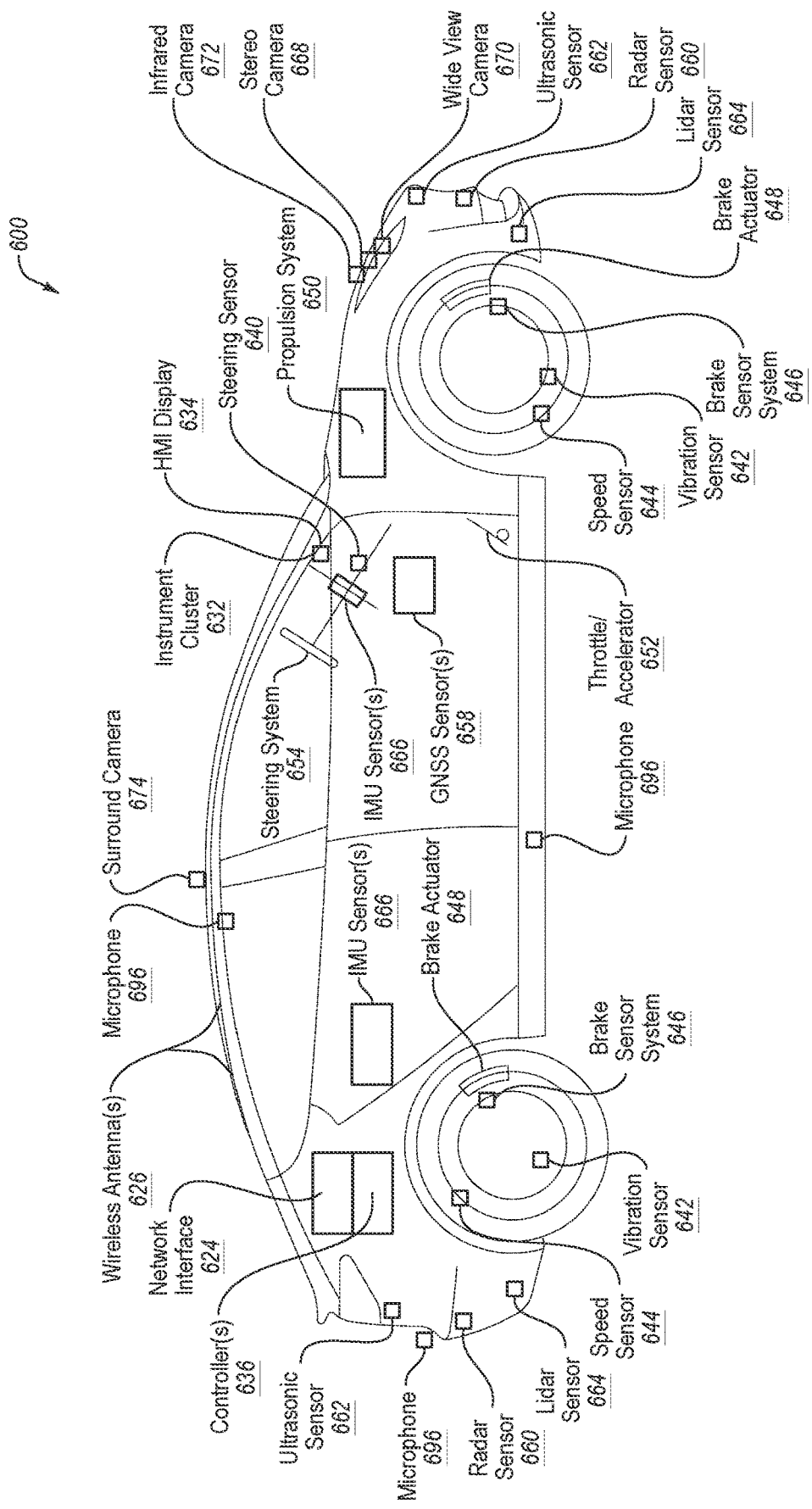
FIG. 6A is an illustration of an example autonomous vehicle, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. The vehicle 600 may be capable of functionality in accordance with one or more of Level 1-Level 5 of the autonomous driving levels. For example, the vehicle 600 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 600 or other machine, such as being fully autonomous, being highly autonomous, being conditionally autonomous, being partially autonomous, providing assistive autonomy, being semi-autonomous, being primarily autonomous, or other designation.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 615 and/or modem(s) to communicate over one or more networks. For example, the network interface 624 may be capable of communication over LTE, WCDMA, UMTS, GSM, CDMA2000, etc. The wireless antenna(s) 615 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
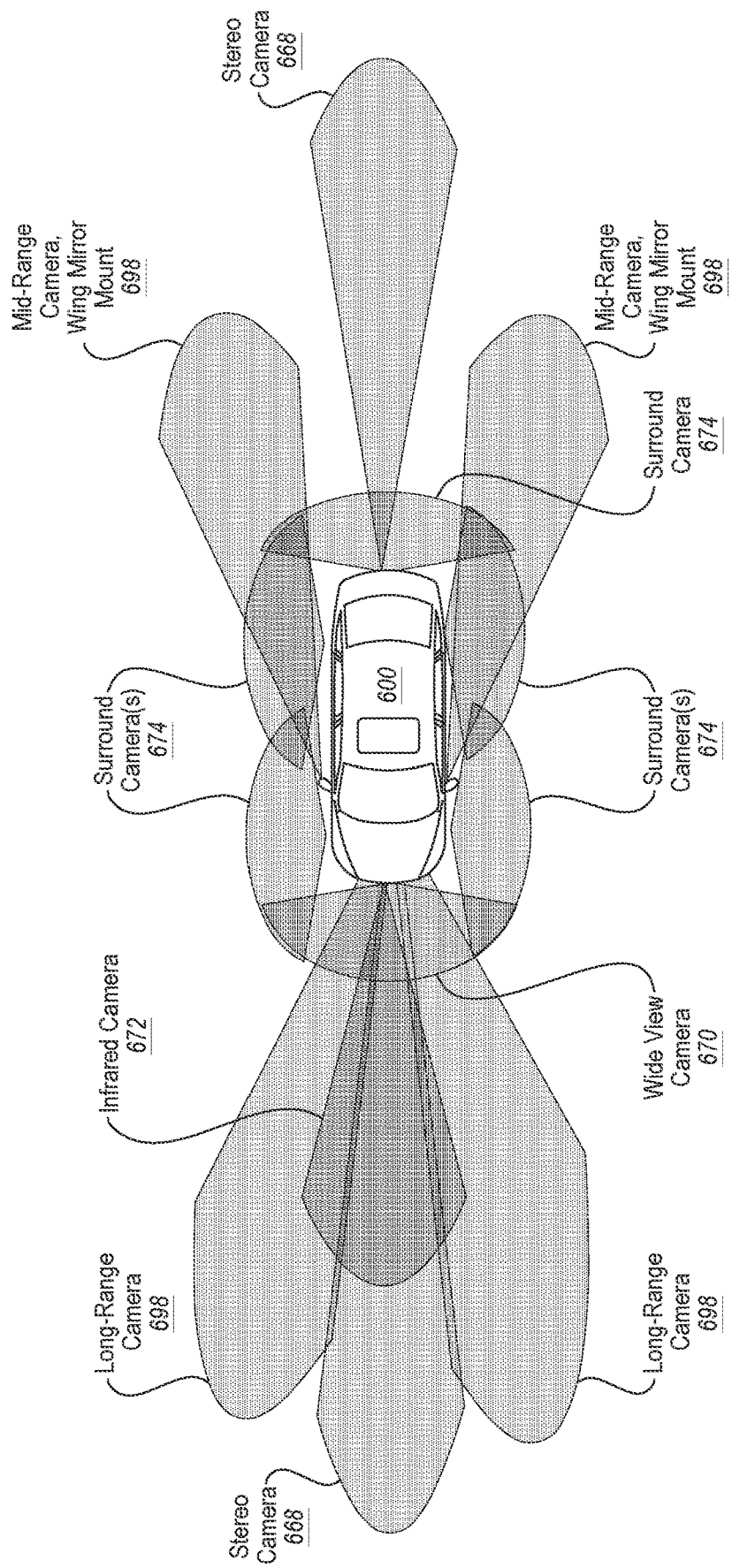
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
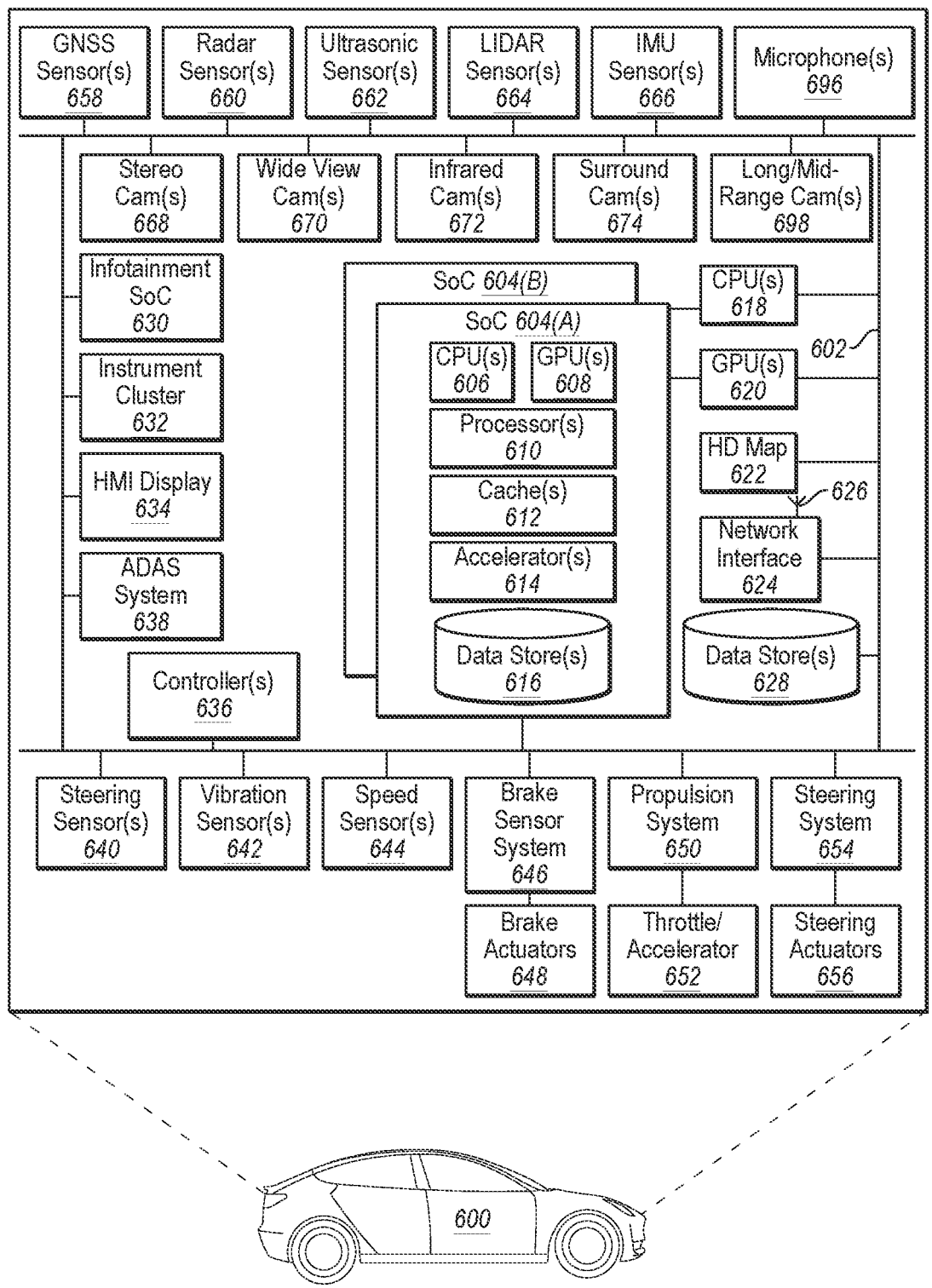
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 604 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced sy computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem. DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet, sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK).

The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 615 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 140 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 1400 m, with an accuracy of 2 cm-3 cm, and with support for a 1400 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation. Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 615 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
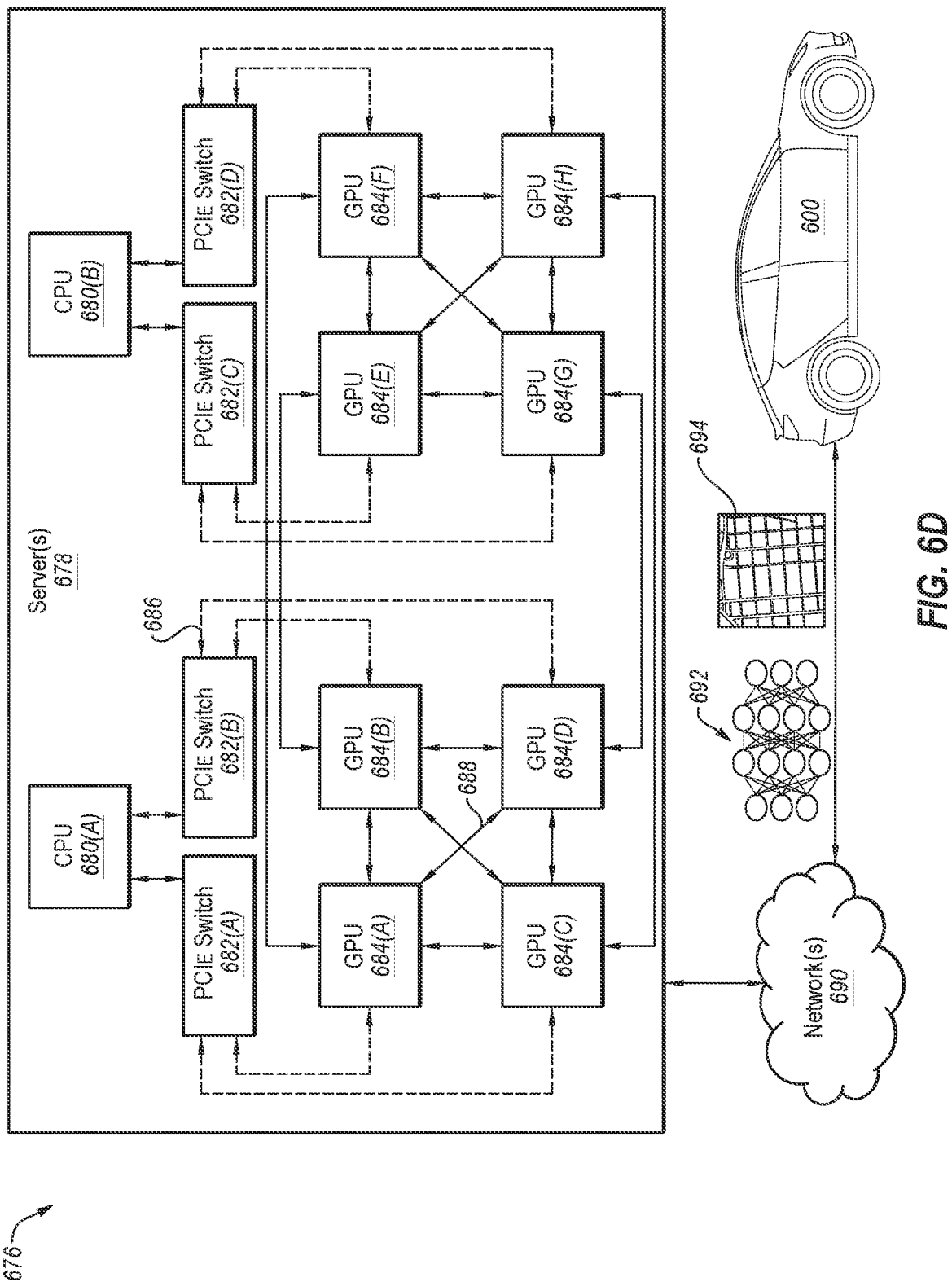
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684). PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
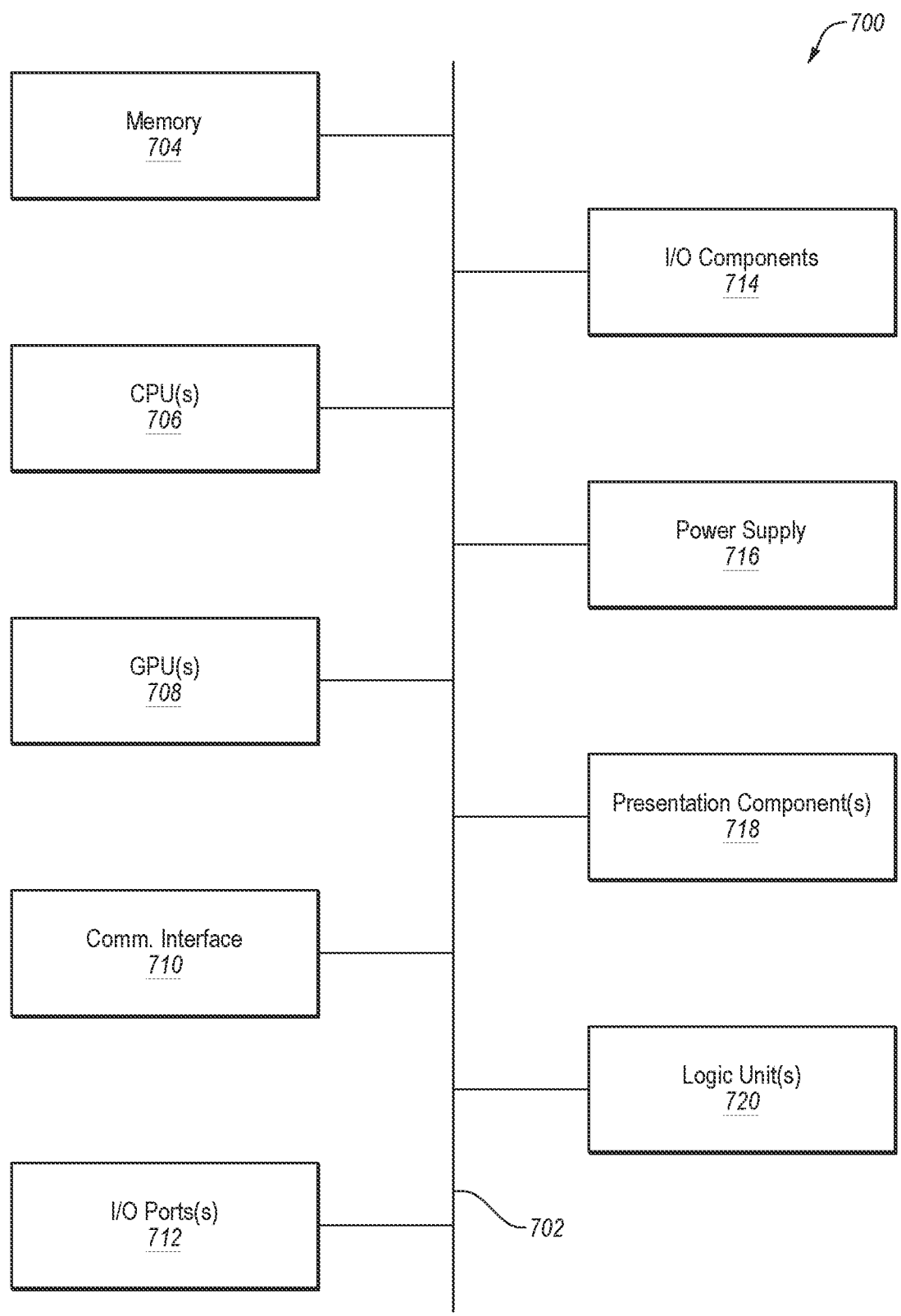
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology. CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs). Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
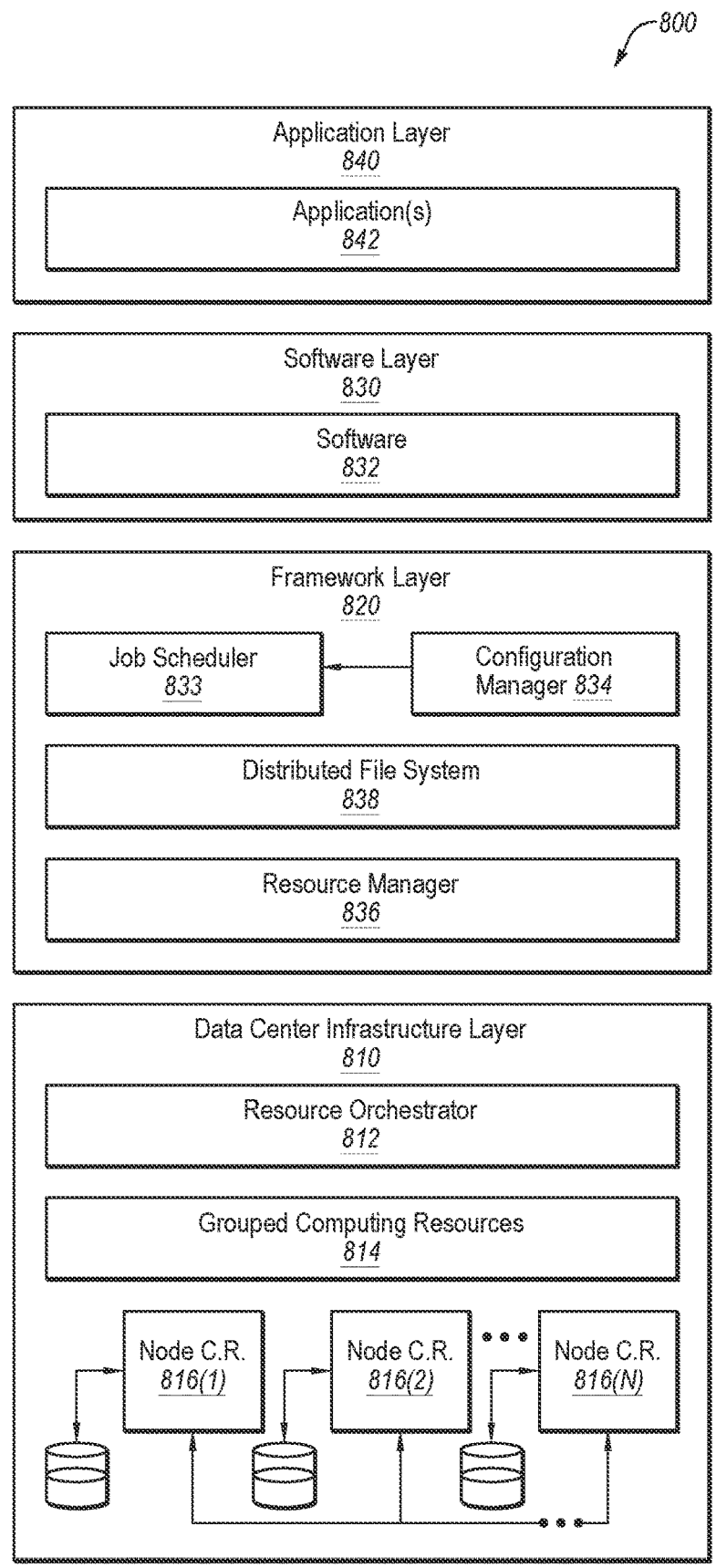
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-816(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 800. In at least one embodiment, trained or deployed machine learning models corresponding to one or more neural networks may be used to infer or predict information using resources described in the present disclosure with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   identifying reference portions corresponding to a bounding shape that corresponds to an object, the bounding shape being determined based at least on a plurality of sensor measurements corresponding to the object;
   obtaining a first state estimate corresponding to the object, the first state estimate including a first position estimate and a first velocity vector estimate;
   obtaining, based at least on first sensor data corresponding to a first portion of the object, a first position measurement;
   determining that the first position measurement corresponds to a first reference portion that is one of the reference portions corresponding to the bounding shape;
   determining a first expected position corresponding to the first portion based at least on the first reference portion;
   determining a second position estimate corresponding to the object, the second position estimate being based at least on the first expected position and the first state estimate; and
   performing one or more operations corresponding to a machine based at least on the second position estimate.

2. The method of claim 1, wherein the identified reference portions include:
   a first reference edge;
   a second reference edge; and
   a reference vertex at which the first reference edge and the second reference edge intersect.

3. The method of claim 1, wherein the determining that the first position measurement corresponds to the first portion is based at least on the first position measurement being within a predetermined threshold distance of the first reference portion.

4. The method of claim 1, prior to determining the first expected position corresponding to the first portion, further comprising:
 filtering out at least a portion of the first sensor data based at least on the portion of the first sensor data corresponding to locations outside of a predetermined threshold distance from the first reference portion.

5. The method of claim 2, wherein the reference vertex corresponds to the portion of the object located nearest a sensor generating the plurality of sensor measurements.

6. The method of claim 2, wherein the reference vertex corresponds to the portion of the object within a best line of sight for a sensor generating the plurality of sensor measurements.

7. The method of claim 3, wherein the sensor includes a RADAR sensor.

8. A system comprising:
 one or more processing units to perform operations comprising:
 identifying reference portions corresponding to a bounding shape that corresponds to an object, the bounding shape being based at least on a plurality of sensor measurements corresponding to the object;
 obtaining a first state estimate corresponding to the object, the first state estimate including a first position estimate and a first velocity vector estimate;
 receiving first sensor data corresponding to a first portion of the object, the first sensor data including a first position measurement;
 determining that the first position measurement corresponds to a first reference portion that is one of the reference portions corresponding to the bounding shape;
 determining a first expected position corresponding to the first portion based at least on the first reference portion; and
 determining a second position estimate corresponding to the object, the second position estimate being based at least on the first expected position and the first state estimate.

9. The system of claim 8, wherein the identified reference portions include:
 a first reference edge;
 a second reference edge; and
 a reference vertex at which the first reference edge and the second reference edge intersect.

10. The system of claim 8, wherein the determining that the first position measurement corresponds to the first portion is based at least on the first position measurement corresponding to the first sensor data being within a predetermined threshold distance of the first reference portion.

11. The system of claim 8, prior to determining the first expected position corresponding to the first portion, the operations further comprising:
 filtering out at least a portion of the first sensor data based at least on the portion of the first sensor data being located outside of a predetermined threshold distance from the first reference portion.

12. The system of claim 9, wherein the reference vertex corresponds to the portion of the object located nearest a sensor generating the plurality of sensor measurements.

13. The system of claim 9, wherein the reference vertex corresponds to the portion of the object within a best line of sight for a sensor generating the plurality of sensor measurements.

14. The system of claim 12, wherein the sensor includes a RADAR sensor.

15. The system of claim 8, wherein the system is comprised in at least one of:
 a control system for an autonomous or semi-autonomous machine;
 a perception system for an autonomous or semi-autonomous machine;
 a system for performing simulation operations;
 a system for performing digital twin operations;
 a system for performing light transport simulation;
 a system for performing collaborative content creation for 3D assets;
 a system for performing deep learning operations;
 a system for presenting at least one of augmented reality content, virtual reality content, or mixed reality content;
 a system for hosting one or more real-time streaming applications;
 a system implemented using an edge device;
 a system implemented using a robot;
 a system for performing conversational AI operations;
 a system implementing one or more large language models (LLMs);
 a system for generating synthetic data;
 a system incorporating one or more virtual machines (VMs);
 a system implemented at least partially in a data center; or
 a system implemented at least partially using cloud computing resources.

16. A processor comprising processing circuitry to perform operations comprising:
 identifying reference portions corresponding to a bounding shape that corresponds to an object, the bounding shape being based at least on a plurality of sensor measurements corresponding to the object;
 obtaining a first state estimate corresponding to the object, the first state estimate including a first position estimate and a first velocity vector estimate;
 receiving first sensor data corresponding to a first portion of the object, the first sensor data including a first position measurement;
 determining that the first position measurement corresponds to a first reference portion that is one of the reference portions corresponding to the bounding shape;
 determining a first expected position corresponding to the first portion based at least on the first reference portion; and
 determining a second position estimate corresponding to the object, the second position estimate being based at least on the first expected position and the first state estimate.

17. The processor of claim 16, wherein the identified reference portions include:
 a first reference edge;
 a second reference edge; and
 a reference vertex at which the first reference edge and the second reference edge intersect.

18. The processor of claim 16, wherein the determining that the first position measurement corresponds to the first portion is based at least on the first position measurement corresponding to the first sensor data being within a predetermined threshold distance of the first reference portion.

19. The processor of claim 16, prior to determining the first expected position corresponding to the first portion, the operations further comprising:
 filtering out at least a portion of the first sensor data based at least on the portion of the first sensor data being located outside of a predetermined threshold distance from the first reference portion.

20. The processor of claim 17, wherein the reference vertex corresponds to the portion of the object located nearest a sensor generating the plurality of sensor measurements.

\* \* \* \* \*